United States Patent
Chaiko et al.

(10) Patent No.: US 11,124,856 B1
(45) Date of Patent: Sep. 21, 2021

(54) SYSTEM AND METHOD FOR ENHANCED METAL RECOVERY DURING ATMOSPHERIC LEACHING OF METAL SULFIDES

(71) Applicants: FLSmidth A/S, Valby (DK); David J. Chaiko, South Jordan, UT (US)

(72) Inventors: David J. Chaiko, South Jordan, UT (US); Frank Baczek, Salt Lake City, UT (US); Sara (Sally) Rocks, Sandy, UT (US); Carlos Eyzaguirre, Draper, UT (US)

(73) Assignee: FLSmidth A/S

( * ) Notice: Subject to any disclaimer, the term of this patent is extended or adjusted under 35 U.S.C. 154(b) by 0 days.

(21) Appl. No.: 15/526,826

(22) PCT Filed: Nov. 20, 2015

(86) PCT No.: PCT/US2015/061761
§ 371 (c)(1),
(2) Date: Sep. 5, 2017

(87) PCT Pub. No.: WO2016/081799
PCT Pub. Date: May 26, 2016

Related U.S. Application Data

(60) Provisional application No. 62/082,293, filed on Nov. 20, 2014.

(51) Int. Cl.
*C22B 3/00* (2006.01)
*C22B 3/02* (2006.01)
(Continued)

(52) U.S. Cl.
CPC .................. *C22B 3/02* (2013.01); *C22B 3/08* (2013.01); *C22B 15/0071* (2013.01); *C22B 15/0095* (2013.01); *C01B 17/06* (2013.01)

(58) Field of Classification Search
CPC ......... C22B 3/02; C22B 3/08; C22B 15/0071; C22B 15/0095
See application file for complete search history.

(56) References Cited

U.S. PATENT DOCUMENTS 5,917,116 A * 6/1999 Johnson .............. C22B 15/0071
75/710
6,159,435 A 12/2000 Nguyen
(Continued)

FOREIGN PATENT DOCUMENTS

CA 2017079 A1 2/2001
WO 2013188982 A1 12/2013

OTHER PUBLICATIONS

International Preliminary Report on Patentability (dated Dec. 30, 2016).

*Primary Examiner* — Steven J Bos
(74) *Attorney, Agent, or Firm* — Jeffrey A. Sharp

(57) ABSTRACT

Systems for improving metal leach kinetics and metal recovery during atmospheric or substantially atmospheric leaching of a metal sulfide are disclosed. In some embodiments, an oxidative leach circuit 200 may employ Mechano-Chemcial/Physico-Chemical processing means for improving leach kinetics and/or metal recovery. In preferred embodiments, the Mechano-Chemcial/Physico-Chemical means comprises various combinations of stirred-tank reactors 202 and shear-tank reactors 212. As will be described herein, the stirred-tank reactors 202 and shear-tank reactors 212 may be arranged in series and/or in parallel with each other, without limitation. In some non-limiting embodiments, a shear-tank reactor 212 may also be disposed, in-situ, within a stirred-tank reactor 202.

7 Claims, 15 Drawing Sheets

Circuit used for batch leach test of chalcopyrite dissolution according to an aspect of the present invention wherein a stirred reactor is coupled to a Shear-Tank Reactor.

(51) Int. Cl.
  *C22B 15/00*     (2006.01)
  *C22B 3/08*      (2006.01)
  *C01B 17/06*     (2006.01)

(56) References Cited

U.S. PATENT DOCUMENTS

| | | |
|---|---|---|
| 8,061,882 B2 | 11/2011 | Bita et al. |
| 2003/0041692 A1* | 3/2003 | Kanno ................ C22B 3/08 75/743 |
| 2010/0028251 A1 | 2/2010 | Roche et al. |
| 2010/0200487 A1 | 8/2010 | Hassan et al. |
| 2012/0328494 A1 | 12/2012 | Dreisinger et al. |

\* cited by examiner

Circuit used for batch leach test of chalcopyrite dissolution according to an aspect of the present invention wherein a stirred reactor is coupled to a Shear-Tank Reactor.

Batch leach test of chalcopyrite dissolution according to an aspect of the present invention wherein a stirred reactor is coupled to a Shear-Tank Reactor.

Copper dissolution as a function of the square root of time demonstrating the dominant role of diffusion as a rate controlling process.

Leaching of a chalcopyrite concentrate having a P80 of about 16μm according to an embodiment of the invention.

Duplicate chalcopyrite leach tests (□, ○) in the absence of initial $Cu^{2+}$ in solution compared to results containing initial $Cu^{2+}$ (△) in the lixivant.

Dissolution of Cu from a chalcopyrite concentrate. During the first 20-30 min of the reaction, approximately 30% of the total Cu dissolution was completed without a net consumption of acid as evidenced by the lack of increase in pH between 0.05 and 0.4 hrs.

(MECHANO-CHEMICAL PROCESSING)

SYSTEM AND METHOD FOR ENHANCED METAL RECOVERY DURING ATMOSPHERIC LEACHING OF METAL SULFIDES

CROSS-REFERENCE TO RELATED APPLICATIONS

This application is a national stage entry of International Patent Application No. PCT/US2015/061761 filed on 20 Nov. 2015 and titled "SYSTEM AND METHOD FOR ENHANCED METAL RECOVERY DURING ATMOSPHERIC LEACHING OF METAL SULFIDES," the contents of which is hereby incorporated by reference in its entirety for any and all purposes as if fully set forth herein. This application claims the benefit of U.S. Provisional Patent Application No. 62/082,293 filed on 20 Nov. 2014 also titled "SYSTEM AND METHOD FOR ENHANCED METAL RECOVERY DURING ATMOSPHERIC LEACHING OF METAL SULFIDES," the contents of which is hereby incorporated by reference in its entirety for any and all purposes as if fully set forth herein. This application relates to International Patent Application No. PCT/US2015/050045 filed on 14 Sep. 2014 and titled "SYSTEM AND METHOD FOR ENHANCED METAL RECOVERY DURING ATMOSPHERIC LEACHING OF METAL SULFIDES," the contents of which is hereby incorporated by reference in its entirety for any and all purposes as if fully set forth herein.

FIELD OF THE INVENTION

Embodiments of the invention relate to equipment, flowsheets, and processes for improving metal value extraction from metal sulfide ores. In particular, systems and methods for increasing metal recovery within an atmospheric or substantially atmospheric oxidative leach circuit are disclosed.

BACKGROUND OF THE INVENTION

Current and past methods of atmospheric leaching of primary metal sulfides (e.g., Chalcopyrite, Tennantite, and Enargite), may suffer from slow reaction kinetics and poor metal recoveries due to physical passivation effects during oxidative leaching. Physical passivation occurs when the growth of an elemental sulfur product layer occludes the surfaces of the particles being leached. The sulfur reaction product layer acts as a physical barrier, impeding the transport of reactants and products from the reaction plane.

A number of factors may enhance the detrimental effects of the sulfur product, with regard to metal dissolution, by altering the porosity and/or tortuosity of the product layer. These factors, individually or collectively, include crystal phase transformations, partial melting and recrystallization, or complete crystal melting. The range of passivation effects will depend upon the temperature of the reaction medium and the temperature at the reaction zone which may be different from the overall system temperature. This temperature difference may be sustained throughout the entire leach process, or it may be transitory.

Other mechanisms of passivation can include the formation of non-stoichiometric, metal-deficient sulfide phases that are resistant toward further anodic dissolution reactions. Furthermore, if the dissolution of the metal sulfide is taking place via an electrochemical redox mechanism, the anodic dissolution step will be dependent upon the pH and redox potential at the reaction plane.

A number of factors, known to those skilled in the art, can make it difficult to maintain an optimum redox potential and thereby achieve complete metal recovery at maximum dissolution rates. In some instances, leaching of primary metal sulfides from ore concentrates may also suffer from slow reaction kinetics and poor metal recoveries due to residual frothing agents used during froth flotation. The residual frothing agents may be present on particles being leached and interfere with superficial leaching chemistries.

A number of past methods have been attempted to increase metal leach rates by employing leach catalysts. One approach suggested addressing the passivation issue by increasing electron transport though an electrically-resistive, reaction-product layer by doping the layer with fine particulate carbon (see for example U.S. Pat. No. 4,343,773). Moreover, a more recently-proposed method (US-2012/0279357) for addressing passivation relies on the addition of an activated carbon catalyst to enhance the leach rate of arsenic-containing copper sulfides. Still other approaches have used silver-based catalytic leach systems for enhancing the copper dissolution rates in acidic ferric sulfate media (J. D. Miller, P. J. McDonough and P. J. Portillo, Electrochemistry in Silver Catalyzed Ferric Sulfate Leaching of Chalcopyrite, in Process and Fundamental Considerations of Selected Hydrometallurgical Systems, M. C. Kuhn, Ed., SME-AIME, New York, pp. 327-338, 1981), while others have used silver-activated pyrite to accomplish similar results (U.S. Pat. No. 8,795,612). The Applicant has further recently proposed a method and process for the enhanced leaching of copper-bearing sulfide minerals which utilizes microwave irradiation during leaching to combat the adverse effects of passivation on leaching (WO2014074985A1).

Still others have adopted pre-leach, ultra-fine grinding (i.e., purely mechanical pre-leach activation via particle size reduction) of a copper sulfide concentrate to achieve rapid post-grinding leach kinetics (U.S. Pat. No. 5,650,057). U.S. Pat. No. 5,993,635 describes a method for recovering copper from sulfide-mineral compositions which comprises the step of ultra-fine grinding of the leach feed to a P80 of about 3-5 µm (see Example 3 in U.S. Pat. No. 5,993,635). While copper dissolutions of 95% or greater were achieved in 10 hours on a small scale, grinding to such a small particle size prior to leaching becomes progressively less economical in mid- to low-grade metal concentrates.

A few prior methods have combined ultra-fine grinding and leaching in so-called batch Mechano-Chemical leaching processes; however, these leaching processes are high-energy circular "batch" processes which do not provide for continuous downstream flow or plug flow. Moreover, all prior art methods have, to date, required excessively large energy inputs to achieve significant levels of copper dissolution from chalcopyrite. While leach times to achieve 80% copper extraction have been demonstrated to be as short as 1 hour, the approach is difficult to adapt for large-scale commercial operation (D. A. Rice, J. R. Cobble, and D. R. Brooks, Effects of Turbo-milling Parameters on the Simultaneous Grinding and Ferric Sulfate Leaching of Chalcopyrite, RI 9351, US Bureau of Mines, 1991). Furthermore, copper recoveries in excess of 95-97% were not achievable due to passivation at high elemental sulfur loading, which the inventors have interpreted as indicating a plurality of mechanisms are actively impeding metal dissolution and recovery.

Furthermore, while mechano-chemical processes can accelerate reaction rates by taking advantage of the immediate reactivity of free radicals generated at the moment of bond breakage, prior art methods have not been known, nor anticipated, to be operative at the atomic level and in reactions not involving the making or breaking of chemical bonds (e.g., acceleration of the oxidation of ferrous to ferric).

Even with pretreatment by ultra-fine grinding, surface passivation reactions continue to be problematic. Efforts to reduce leach times to under 9 hours in which the concentrates are pretreated prior to leaching, by ultra-fine grinding of metal sulfides, have been largely unsuccessful. Improved methods are needed to economically reduce leach times and increase metal dissolution and recoveries to 98% and above.

OBJECTS OF THE INVENTION

It is preferred that embodiments reduce and/or eliminate the need for the addition of a superfluous reagent or reagents into a leach circuit, to mitigate additional costs associated with purchasing, shipping, and dosing.

Moreover, it is preferred that embodiments reduce and/or eliminate the need for the addition of a superfluous reagent or reagents into a leach circuit, to mitigate negative impacts to downstream SX/EW systems.

It is further desired to mitigate the effects of physical and/or electrochemical passivation by employing novel Mechano-Chemical/Physico-Chemical techniques in a continuous oxidative leach circuit of a continuous metal recovery flowsheet.

These and other objects of the present invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

An oxidative leach circuit is disclosed. The oxidative leach circuit may comprise at least one stirred-tank reactor and at least one shear-tank reactor configured to impart a higher shear to particles than the at least one stirred-tank reactor. In some embodiments, the at least one shear-tank reactor operates at a higher power density than the at least one stirred-tank reactor. The at least one stirred-tank reactor and the at least one shear-tank reactor may be connected in series, for example, in an inter-stage configuration. The at least one stirred-tank reactor and the at least one shear-tank reactor may be connected in parallel, for example, in an intra-stage configuration. The at least one shear-tank reactor may be disposed within the at least one stirred-tank reactor, for example, in an in-situ configuration. The oxidative leach circuit may, in some embodiments, comprise at least two stirred-tank reactors. The oxidative leach circuit may, in some embodiments, comprise at least two shear-tank reactors. The at least one shear-tank reactor may provide a mechano-chemical or physico-chemical reaction and the at least one stirred-tank reactor may provide a chemical reaction during operation. The at least one shear-tank reactor may, in some embodiments, comprise a stirred media reactor, a high-shear reactor comprising one or more high-shear impellers, or a high-shear reactor comprising a high shear rotor and a high shear stator. The at least one shear-tank reactor may comprise a stirred media reactor which comprises grinding media. The at least one shear-tank reactor may comprise one or more high-shear impellers. The at least one shear-tank reactor may comprise one or more pumping blades. Each shear-tank reactor may comprise at least one high shear rotor and at least one high shear stator.

A method of improving leach kinetics and metal recovery during atmospheric or substantially atmospheric leaching of a metal sulfide is further disclosed. According to some embodiments, the method may comprise the steps of: (a) producing a metal sulfide concentrate via flotation; (b) processing the metal sulfide concentrate in one or more stirred-tank reactors to produce an oxidatively-processed metal sulfide concentrate; and, (c) physico-chemically processing particles within the metal sulfide concentrate or within the oxidatively-processed metal sulfide concentrate in one or more shear-tank reactors; wherein the one or more shear-tank reactors are configured to impart a greater amount of shear on the particles than the one or more stirred-tank reactors. The method may further comprise the step of (d) extracting metal from the particles, the metal comprising iron, nickel, cobalt, copper, zinc, silver, gold, antimony, or bismuth. The method may further comprise the step of (e) extracting a non-metal from the particles, the non-metal comprising arsenic or sulfur. Step (c) may be performed in series with step (b), or step (c) may be performed in parallel with step (b), without limitation. Step (c) may, in some instances, be performed before or after step (b). In some embodiments, step (c) and step (b) may be performed in a hybrid configuration wherein at least one of the one or more shear-tank reactors are provided within at least one of the one or more stirred-tank reactors. The one or more shear-tank reactors may comprise a stirred media reactor, a high-shear stirred reactor comprising one or more high-shear impellers, or a high-shear reactor comprising a high shear rotor and high shear stator, without limitation. In some instances, the one or more shear-tank reactors may comprise grinding media. In some instances, the one or more shear-tank reactors may comprise at least one high shear impeller. In some instances, the one or more shear-tank reactors may comprise at least one pumping blade. In some instances, the one or more shear-tank reactors may comprise at least one high shear rotor and at least one high shear stator.

An oxidative leach circuit 200 for improving leach kinetics and metal recovery during atmospheric or substantially atmospheric leaching of a metal sulfide is further disclosed, the oxidative leach circuit 200 comprising: (a) at least one stirred tank leach reactor; and (b) at least one shear-tank reactor configured to impart a greater amount of shear to particles of a metal sulfide than the at least one stirred tank reactor. The oxidative leach circuit may comprise at least two stirred tank reactors and (c) a solid-liquid separation device disposed between the at least two stirred tank reactors. The stirred tank reactor downstream of the solid-liquid separation device may be volumetrically smaller than the stirred tank leach reactor upstream of the solid-liquid separation device. In some embodiments, the oxidative leach circuit may further comprise (c) a solid-liquid separation device disposed between the at least one shear-tank reactor and the at least one stirred tank reactor. The at least one shear-tank reactor may be disposed within said at least one oxidative stirred tank leach reactor. The at least one shear-tank reactor may be disposed between two stirred tank reactors. The at least one shear-tank reactor may be arranged in an intra-stage configuration with the at least one stirred tank reactor; wherein the at least one shear-tank reactor may be fed by the at least one stirred tank reactor, and wherein the at least one shear-tank reactor may re-feed the at least one stirred tank reactor. The at least one shear-tank reactor may be selected from a stirred media reactor, a high-shear stirred reactor comprising one or more high-shear impellers and/or pumping blades, or a high-shear reactor comprising a high shear rotor and stator. The at least one shear-tank reactor may comprise grinding media. The at least one shear-tank reactor may comprise one or more high shear impellers selected from the following list: a gate blade, a pitched blade, a bow blade, a coil blade, a curved radial blade, a sweep blade, a dis-mounted blade, a dual hi-speed blades, an alternating tooth blade, non-alternating tooth blade, a high-vane blade, a Cowles blade, and a pick blade. The at least one shear-tank reactor may comprise at least one high shear rotor and at least one high shear stator. The at least one stirred tank reactor may operate at a first power density and the at least one shear-tank reactor may operate at a second power density which is higher than the first power density.

In some embodiments, an oxidative leach circuit may comprise a first stirred-tank reactor; a second stirred-tank reactor; and a shear reactor disposed between the first stirred-tank reactor and the second stirred-tank reactor. In some embodiments, an oxidative leach circuit may comprise a first shear-tank reactor; a second shear-tank reactor; and a stirred-tank reactor disposed between the first shear-tank reactor and the second shear-tank reactor.

In some embodiments, an oxidative leach circuit may comprise a first stirred-tank reactor; and a shear-reactor or shear-tank reactor disposed within the first stirred-tank reactor. In some embodiments, an oxidative leach circuit may comprise: (a) a first stirred-tank reactor having a first inlet configured to receive a metal sulfide concentrate; a first outlet configured to convey the metal sulfide concentrate downstream to another stirred-tank reactor; a first intra-stage outlet configured to convey the metal sulfide concentrate to a shear-tank reactor; and a first intra-stage inlet configured to receive the metal sulfide concentrate from the shear-tank reactor; and (b) a shear-tank reactor having a first intra-stage inlet configured to receive the metal sulfide concentrate from the first stirred-tank reactor; and a first intra-stage outlet configured to convey the metal sulfide concentrate to the first stirred-tank reactor.

In some embodiments, an oxidative leach circuit may comprise: (a) a first stirred-tank reactor having: an inlet configured to receive a metal sulfide concentrate; and an outlet configured to convey the metal sulfide concentrate from the first stirred-tank reactor, (b) a second stirred-tank reactor having an inlet and being provided downstream of the first stirred-tank reactor; (c) a solid-liquid separation device provided between the first stirred-tank reactor and the second stirred-tank reactor, the solid-liquid separation device operatively communicating with the outlet of the first stirred-tank reactor and the inlet of the second stirred-tank reactor, wherein the solid-liquid separation device is configured to dewater the metal sulfide concentrate received from the first stirred-tank reactor and pass the liquid fraction to the inlet of the second stirred-tank reactor; and (d) at least one shear-tank reactor configured to impart higher shear to particles within the metal sulfide concentrate than either the first stirred-tank reactor or the second stirred-tank reactor. The second stirred-tank reactor may have a smaller volumetric ratio than the first stirred-tank reactor. The first stirred-tank reactor or the second stirred-tank reactor may be connected in series to the at least one shear-tank reactor. The first stirred-tank reactor or the second stirred-tank reactor may be connected in parallel to the at least one shear-tank reactor. The at least one shear-tank reactor may be disposed within the first stirred-tank reactor or the second stirred-tank reactor. The at least one shear-tank reactor disposed within the first stirred-tank reactor or the second stirred-tank reactor may comprise a shear reactor which does not comprise a tank or tank portions.

In some embodiments, an oxidative leach circuit may comprise: at least one stirred-tank reactor; and at least one shear-tank reactor comprising reacting particles; wherein the at least one shear-tank reactor is configured with mechanical means for either: i.) synergistically disrupting particle-particle agglomerations resulting from a production of a hydrophobic elemental sulfur reaction product at the surfaces of the reacting particles, or ii.) synergistically re-arranging particle-particle agglomerations resulting from a production of a hydrophobic elemental sulfur reaction product at the surfaces of the reacting particles. In some embodiments, disrupting particle-particle agglomerations comprises breaking particle-particle contacts within a particle-particle agglomeration. In some embodiments, step i) or ii) may alter a diffusion path length to and from a reaction plane. In some embodiments, step i) or ii) may accelerate mass transfer to and from a reaction plane.

In some embodiments, an oxidative leach circuit may comprise at least one stirred-tank reactor; at least one shear-tank reactor, and, a solid/solid separation apparatus downstream of the at least one stirred-tank reactor and the at least one shear-tank reactor; wherein the solid/solid separation apparatus may be configured for separating elemental sulfur reaction products from other particles within the oxidative leach circuit. In some embodiments, the oxidative leach circuit may further comprise a recycle stream operatively connected to the solid/solid separation apparatus, wherein the recycle stream is configured for recycling particles within the oxidative leach circuit which have been separated from elemental sulfur via the solid/solid separation apparatus, and bringing recycled particles to any one or more of the following: a re-grind circuit located upstream of the oxidative leach circuit, the at least one stirred-tank reactor, the at least one shear-tank reactor, or a conditioning tank, without limitation.

A method of leaching is further disclosed. According to some embodiments, the method comprises the steps of: (a) providing an oxidative leach circuit 200 comprising at least one stirred-tank reactor 202 and at least one shear-tank reactor 212; (b) processing a flotation concentrate comprising metal sulfide particles within the at least one stirred-tank reactor 202 and the at least one shear-tank reactor 212; (c) forming agglomerations containing said metal sulfide particles within the at least one stirred-tank reactor 202; and (d) intermittently disrupting the agglomerations within the at least one shear-tank reactor 212 to enhance leach kinetics of the metal sulfide particles, increase metal recovery from the metal sulfide particles, or reduce the effective electrochemical diffusion path lengths within the agglomerations. Step (c) may comprise actively forming agglomerations using a flocculant, rather than passively forming agglomerations.

A method of extracting sulfur from a metal sulfide concentrate is further disclosed. According to some embodiments, the method comprises (a) mechano-chemically and/or physico-chemically processing the particles; (b) separating elemental sulfur from the mechano-chemically and/or physico-chemically processed particles of step (a) using a solid-solid separation apparatus; and (c) removing the elemental sulfur separated in step (b) from the solid-solid separation apparatus. The solid-solid separation apparatus may be configured for particle/particle separation based on density of the mechano-chemically and/or physico-chemically processed particles. The solid-solid separation apparatus may comprise a centrifugal device, such as a gravity centrifugal concentrator (e.g., a batch or continuous variable discharge) or cyclone, without limitation.

A continuous oxidative leach circuit within a metal recovery flowsheet is disclosed. In some embodiments, the oxidative leach circuit may be maintained at a redox potential between 600 mV (SHE) and 800 mV (SHE), for example, between 650 mV (SHE) and 750 mV (SHE). In some embodiments, the oxidative leach circuit is configured for oxidatively leaching a metal sulfide concentrate and may comprise a combination of: a plurality of stirred-tank reactors, and one or more shear-tank reactors. In some embodiments, the stirred-tank reactors may be oxidative leach reactors and may be arranged in series with the shear-tank reactor(s). In some embodiments, the stirred-tank reactors may be arranged in parallel with the shear-tank reactor(s). In some embodiments, the stirred-tank reactors may be arranged both in series and in parallel with shear-tank reactors. In some embodiments, a shear-tank reactor may be disposed within a stirred-tank reactor, in-situ. In some embodiments, a single shear-tank reactor may be shared between multiple, stirred-tank reactors. It is anticipated that various permutations/combinations of the aforementioned configurations may be employed, without limitation.

A metal recovery flowsheet comprising a continuous oxidative leach circuit is also disclosed. The metal recovery flowsheet may comprise: (a) a sulfide concentrator comprising a flotation circuit to produce a metal sulfide concentrate; and (b) an atmospheric or substantially atmospheric metal sulfide leach circuit. The atmospheric or substantially atmospheric metal sulfide leach circuit may comprise an oxidative leach circuit for recovering at least one metal value from the metal sulfide concentrate via dissolution. Various non-limiting embodiments of exemplary oxidative leach circuits can be seen in FIGS. 1-5.

In some embodiments, the oxidative leach circuit may be maintained at a pH below about 1.0 and a redox potential between 600 mV (SHE) and 800 mV (SHE). In some embodiments, the oxidative leach circuit may comprise one or more shear-tank reactors operatively connected to a plurality of stirred-tank reactors. One, some, or all of the stirred-tank reactors may comprise a redox-control source, such as one or more oxygen and/or enriched air spargers. One, some, or all of the shear-tank reactors may comprise a redox-control source, such as one or more oxygen and/or enriched air spargers.

According to some embodiments, oxidative dissolution may occur in a stirred-tank reactor at a redox potential between about 600 to about 800 mV (SHE), a range traditionally known to promote passivation, slowdown, or complete shutdown of leach kinetics.

According to some embodiments, the metal sulfide concentrate comprises chalcopyrite. According to some embodiments, oxidative dissolution is carried out in a shear-tank reactor, wherein the shear-tank reactor may be selected from at least one of the group consisting of: a stirred media reactor, a high-shear stirred reactor comprising one or more high-shear impellers and/or pumping blades, and a high-shear reactor comprising at least one high shear rotor and at least one high shear stator.

According to some embodiments, the oxidative leach circuit may be configured for leaching greater than 80% metal in under about 9 hours (e.g., under about 6 hours) by providing and operating a shear-tank reactor at a power density ranging from about 2 kilowatts per cubic meter to about 100 kilowatts per cubic meter. According to some embodiments, the oxidative leach circuit may be configured for leaching greater than 95% metal in under about 9 hours (e.g., under about 6 hours) by providing and operating a shear-tank reactor at a power density ranging from about 5 kilowatts per cubic meter to about 100 kilowatts per cubic meter.

According to some embodiments, the oxidative leach circuit may be configured for leaching greater than 98% metal in under about 9 hours (e.g., under about 6 hours) by providing and operating a shear-tank reactor at a power density ranging from about 5 kilowatts per cubic meter to about 20 or 30 kilowatts per cubic meter. According to some embodiments, the oxidative leach circuit may be configured for leaching greater than 95% metal in under about 9 hours (e.g., under about 6 hours) by providing and operating a shear-tank reactor at a power density ranging from about 20 kilowatts per cubic meter to about 100 kilowatts per cubic meter. In some preferable embodiments, the metal leached from the metal sulfide comprises copper. In still other embodiments, the metal leached from the metal sulfide comprises zinc.

According to some preferred embodiments, oxidative leaching of metal sulfide particles may be enhanced by a physico-chemical process made possible by an oxidative leach circuit having physico-chemical processing means. The physico-chemical processing means may substantially reduce both the electrochemical passivation and physical passivation of a metal sulfide particle via a physico-chemical mechanism. According to some embodiments, the physico-chemical mechanism may comprise a physical/mechanical shearing process component, for example, at least one shear-tank reactor, and a chemical leaching process component, for example, at least one stirred-tank reactor within the same oxidative leach circuit. According to some embodiments, the shearing process component may be configured to synergistically impart mechanical scrubbing, grinding, attrition, or a combination thereof to metal sulfide particles. According to another embodiment of the invention, the shearing process component may be configured to synergistically impart physical disruption of particle-particle agglomeration resulting from the production of a hydrophobic elemental sulfur reaction product at the surfaces of the reacting metal sulfide particles during oxidative leaching. It should be understood that chemical interactions may occur within the shearing process component and that these chemical interactions may differ from those found within conventional stirred-tank reactors and/or the chemical leaching process component.

According to some embodiments, the shearing process component may comprise a shear-tank reactor, for example, a reactor which is selected from at least one of the group consisting of: a stirred media reactor, a high-shear reactor, a stirred reactor comprising one or more high-shear impellers (e.g., a Cowles blade) and/or pumping blades, and a reactor comprising at least one high-shear rotor and at least one high-shear stator. According to some embodiments, the shearing process component may be situated downstream of the chemical leaching component. According to some embodiments, the shearing process component may be situated upstream of the chemical leaching component. According to some embodiments, the shearing process component may be situated within the chemical leaching component, or vice-versa so as to provide both components of the physico-chemical mechanism within the same device. According to some embodiments, the shearing process component may be situated in series, in parallel, and/or within the chemical leaching component in the same oxidative leach circuit. According to some embodiments, the chemical leaching component and the shearing process component may form portions of a continuous flow-through linear oxidative leach circuit 200, rather than portions of a circular or batch oxidative leach circuit.

According to some embodiments, one or more stirred-tank reactors may be operated under atmospheric pressure and one or more shear-tank reactors may be operated above atmospheric pressure or at atmospheric pressure. According to some preferred embodiments, a shear tank reactor may be configured to operate at less than 20 bar and at or greater than 1 bar. For example, shear-tank reactors disclosed herein may be configured to be operated at an oxygen overpressure pressure ranging from about 1 to about 10 bar. Even more preferably, shear-tank reactors disclosed herein may be configured to be operated at an oxygen overpressure ranging from about 1 to about 5 bar, without limitation. According to some embodiments, metal sulfide particles may spend greater than about 80-95% of their total collective residence time within the stirred-tank reactors—for example, preferably under atmospheric or substantially atmospheric conditions. According to some embodiments, metal sulfide particles may spend less than about 10-20% of their total collective residence time within the shear-tank reactors—for example, under substantially atmospheric conditions or above atmospheric conditions. According to some embodiments, a shearing process occurring within a respective shear-tank reactor may comprise controlling both the pH and redox potential simultaneously by using acid, ferric iron, gaseous $O_2$, air, or a combination thereof.

Turning now to the figures, one or more shear-tank reactors 212 may be employed (also labeled in the drawings as "SMRt") within an oxidative leach circuit 200. In some embodiments, as shown in FIG. 1, the one or more shear-tank reactors 212 may be arranged in series (i.e., "inter-stage") between respective adjacent stirred-tank reactors 202 (also labeled in the drawings as "LEACH"). The stirred-tank reactors 202 are preferably utilized as oxidative leach reactors and may comprise conventional stirred tank reactors (CSTRs), without limitation. In some embodiments, the one or more shear-tank reactors 212 may be arranged in parallel (i.e., "intra-stage") so as to receive feed from and operatively re-feed the same stirred-tank reactor 202, as shown in FIG. 2. In some embodiments, a solid-liquid separation or dewatering step comprising one or more pieces of solid-liquid separation or dewatering equipment may be provided in the leach circuit 200, as shown in the center of FIG. 3, to address excessive concentration buildup within the system. For example, the solid-liquid separation or dewatering equipment may be employed to prevent copper concentrations that exceed solubility limits or prevent copper concentrations that exceed the capabilities of a solvent extraction and electrowinning (SX/EW) system (not shown) located downstream of the oxidative leach circuit 200. In some embodiments, stirred-tank reactors 202 may successively increase in their effective residence time and/or size (e.g., volume) as the metal recovery flowsheet progresses downstream. In this regard, the risk of pregnant leach solution (PLS) becoming too concentrated in copper and iron may be mitigated.

According to some embodiments a wetting agent may be used to control frothing. The wetting agent may comprise a polymeric electrolyte, a polymeric flocculant, or a variety of polymeric electrolytes and polymeric flocculants can be used alone or in combination, without limitation. According to some embodiments, a wetting agent may be advantageously used to reduce the amount of residual metal in leach tailings from the oxidative leach circuit 200 to less than 1 wt. %, more advantageously to less than 0.8 wt. % and more advantageously to less than 0.5 wt. %. Preferably, the amount of residual metal in the leach tailings from the oxidative leach circuits disclosed herein is around, equal to, or less than run-of-mine (ROM) material.

According to some embodiments, one or more shear-tank reactors 212 may be operatively coupled to a plurality of stirred-tank reactors 202, wherein a collective residence time of the metal sulfide particles in the one or more shear-tank reactors 212 depends upon or is a function of overall residence time within the entire oxidative leach circuit 200. The residence time within the one or more shear-tank reactors 212 may also depend upon or be a function of a volumetric ratio between the total combined volume of the stirred-tank reactor(s) 202 within the oxidative leach circuit 200, and the total combined volume of the shear-tank reactor(s) 212 within the oxidative leach circuit 200. The preferred volumetric ratio is not equal to one. According to some embodiments, the volumetric ratio of the shear-tank reactor(s) 212 to the stirred-tank reactor(s) 202 may be between about 1:2 and about 1:200; for example, between about 1:4 and about 1:175; or between about 1:10 and about 1:150; or between about 1:20 and about 1:100; or between about 1:25 and about 1:75; or between about 1:30 and about 1:50, such as approximately 1:40, without limitation.

According to some embodiments, about 90% or greater metal recovery may be achieved in less than 20 hours (e.g., less than 10 hours) while operating portions of the oxidative leach circuit 200 at a temperature below the melting point of elemental sulfur. According to some embodiments, about 90% or greater metal recovery may be achieved in less than 9 hours (e.g., less than 6 hours) while operating portions of the oxidative leach circuit 200 at a temperature below the melting point of elemental sulfur. According to some embodiments, about 95% or greater metal recovery may be achieved in less than 10 hours while operating portions of the oxidative leach circuit 200 at a temperature below the melting point of elemental sulfur. According to some embodiments, about 95% or greater metal recovery may be achieved in less than 6 hours while operating portions of the oxidative leach circuit 200 at a temperature below the melting point of elemental sulfur.

According to some embodiments, the metal recovery flowsheet may further comprise an ultra-fine grinding mill (not shown for clarity) for ultra-fine grinding the concentrate upstream of the oxidative leach circuit 200 (i.e., prior to oxidative leaching). According to some embodiments, the ground concentrate may comprise a P95 of 100 microns or finer. According to some embodiments, the ground concentrate may comprise a P95 of 75 microns or finer. According to some embodiments, the ground concentrate may comprise a P95 of 40 microns or finer, prior to oxidative leaching.

According to some embodiments, the metal recovery flowsheet may further comprise means for the addition of viscosity modifiers for increasing shear experienced by particles within the shear-tank reactors 212.

BRIEF DESCRIPTION OF THE DRAWINGS

To complement the description which is being made, and for the purpose of aiding to better understand the features of the invention, a set of drawings illustrating preferred apparatus and methods of using the same is attached to the present specification as an integral part thereof, in which the following has been depicted with an illustrative and non-limiting character. It should be understood that like reference numbers used in the drawings (if any are used) may identify like components.

Figure 1:
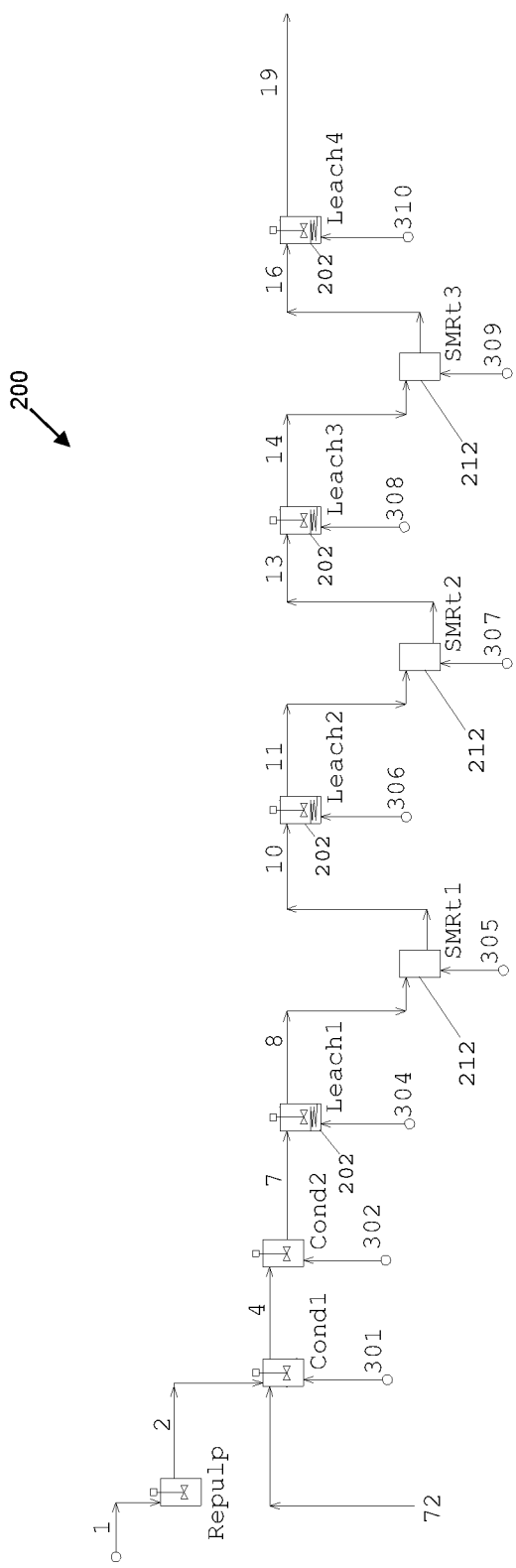
FIG. 1 is a schematic diagram illustrating a non-limiting, exemplary continuous oxidative leach circuit portion of a metal recovery flowsheet which might employ certain aspects of the invention, wherein novel shear-tank reactors may be disposed between stirred-tank reactors, in series; in other words, a shear-tank reactor within an oxidative leach circuit may receive leach slurry from an upstream stirred-tank reactor and/or feed a downstream stirred-tank reactor. The oxidative leach circuit may, as shown, comprise at least one pre-conditioning tank.

In the following, the invention will be described in more detail with reference to drawings in conjunction with exemplary embodiments.

DETAILED DESCRIPTION OF THE INVENTION

The following description of the non-limiting embodiments shown in the drawings is merely exemplary in nature and is in no way intended to limit the inventions disclosed herein, their applications, or uses.

Figure 12:
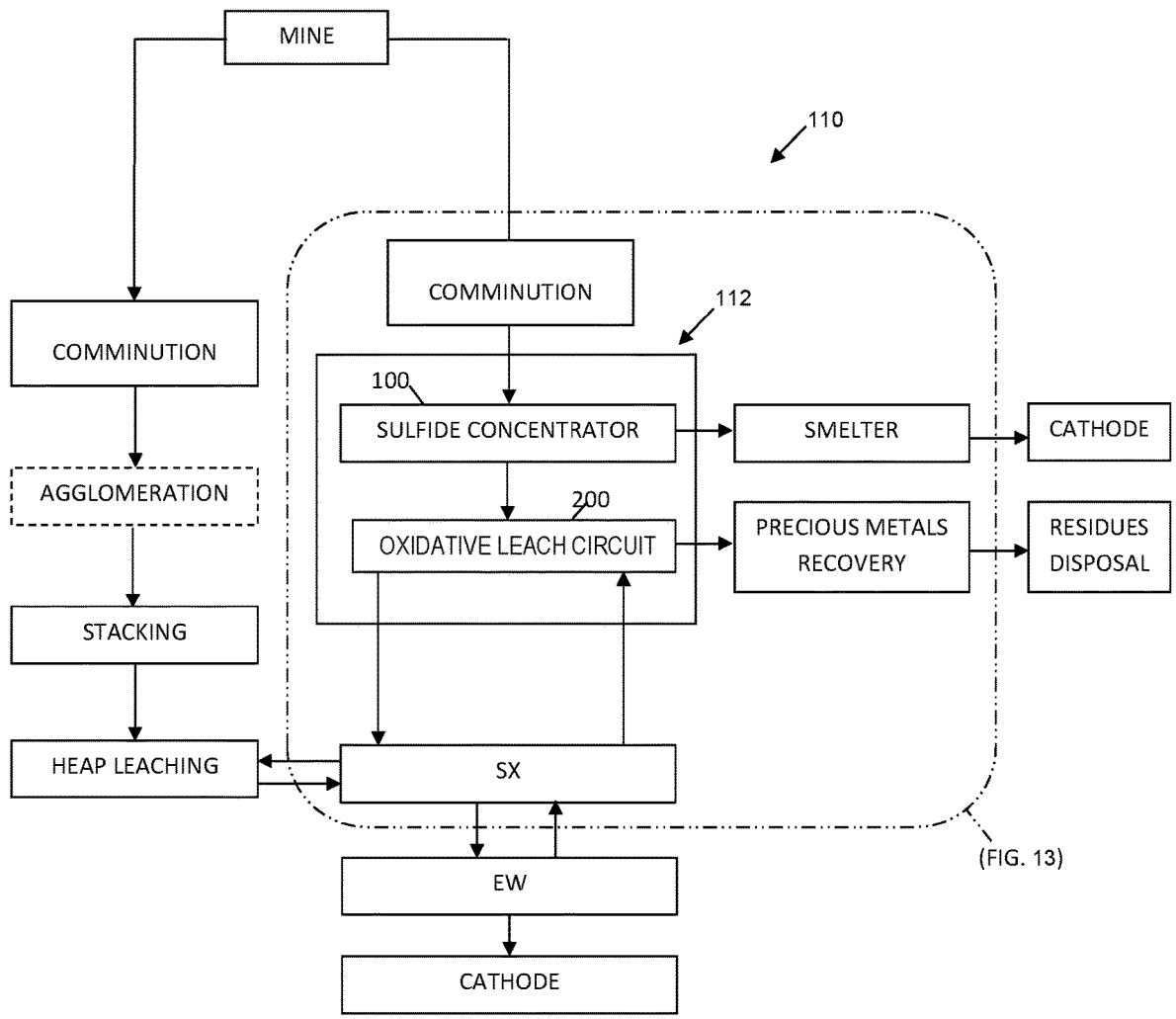
FIG. 12 is a schematic diagram illustrating a non-limiting, exemplary metal recovery flowsheet which might advantageously employ certain embodiments of the novel oxidative leach circuits disclosed herein.

As schematically shown in FIG. 12, embodiments of the invention may comprise a metal recovery flowsheet 110 having a unit operation 112. The unit operation 112 may comprise an atmospheric or substantially atmospheric oxidative leach circuit 200 downstream of a sulfide concentrator circuit 100, without limitation. Peripheral flowsheet operations, typical to such processes known to those skilled in the art of minerals processing, are not shown for clarity.

In some preferred embodiments, most or all of the oxidative leaching within the oxidative leach circuit 200 may occur at atmospheric pressure conditions. In some embodiments, a small amount of oxidative leaching (e.g., leaching occurring within one or more shear-tank reactors 212) may occur at atmospheric conditions or optionally above atmospheric conditions.

In some preferred embodiments, a majority of the cumulative leaching time may occur at atmospheric pressure conditions (e.g., within one or more stirred-tank reactors 202), and a minimal amount of cumulative leaching time may occur above atmospheric conditions. For example, in some non-limiting embodiments, an oxidative leach circuit 200, such as the ones shown in FIGS. 1-5, may comprise one or more open or substantially-atmospheric stirred-tank reactors 202, and one or more shear-tank reactors 212 which may be enclosed and preferably configured to be pressurized (e.g., to 1-20 bar, 1-10 bar, 1-5 bar, approximately 5 bar, or the like), receive oxygen, an oxygen containing gas, and/or optionally contain grinding media, without limitation. "Grinding media", where used herein, in the appending claims, and in co-pending applications, may comprise a foreign material which is non-native to the flotation concentrate, and may include any one or more of the following alone or in combination, without limitation: high-density media (e.g., ceramic or metal beads, balls, materials of various shapes, or metal such as blister copper, or off spec, copper cathode), particulate media (e.g., silica, sand, quartz, smelter slag, polytetrafluoroethylene), low-density media (e.g., polymeric materials of various shapes, shredded tire or conveyor belt material, carbon). In most of the provided examples, ceramic media in the form of uniformly-sized beads was used.

In some embodiments, a shear-tank reactor 212 may comprise an enclosed high-shear stirred reactor configured to be pressurized (e.g., to 1-20 bar, 1-10 bar, 1-5 bar, approximately 5 bar, or the like), receive oxygen, and/or impart a higher level of shear than what might be expected from a conventional stirred-tank reactor. The higher level of shear may be accomplished, for instance, through the provision of one or more high shear impellers and/or pumping blades, without limitation. In some embodiments, the high shear impellers may be selected from the group consisting of: a Cowles disperser blade, a sawblade mixing impeller, a dispersion blade, a saw tooth dispersion blade, an angled tooth blade, an ultra-shear dispersion blade, a high-flow dispersion blade, a high-shear rotor/stator, and a combination thereof, without limitation.

In some preferred embodiments, the volume of a shear-tank reactor 212 may be relatively less than the volume of a stirred-tank reactor 202. In some preferred embodiments, the energy consumed by a shear-tank reactor 212 may be relatively less than the energy consumed by a neighboring stirred tank reactor 202. In some preferred embodiments, the power density of a shear-tank reactor 212 may be relatively less than the power density of a neighboring stirred tank reactor 202. Accordingly, preferred embodiments of an oxidative leach circuit 200 call for shear-tank reactors 212 that are substantially reduced in size as compared to stirred-tank reactors 202.

If one or more separate shear-tank reactors 212 are utilized in combination with a plurality of stirred-tank reactors 202 within the same oxidative leach circuit 200, then it is envisaged that slurry recycle may be employed within the oxidative leach process.

Figure 13:
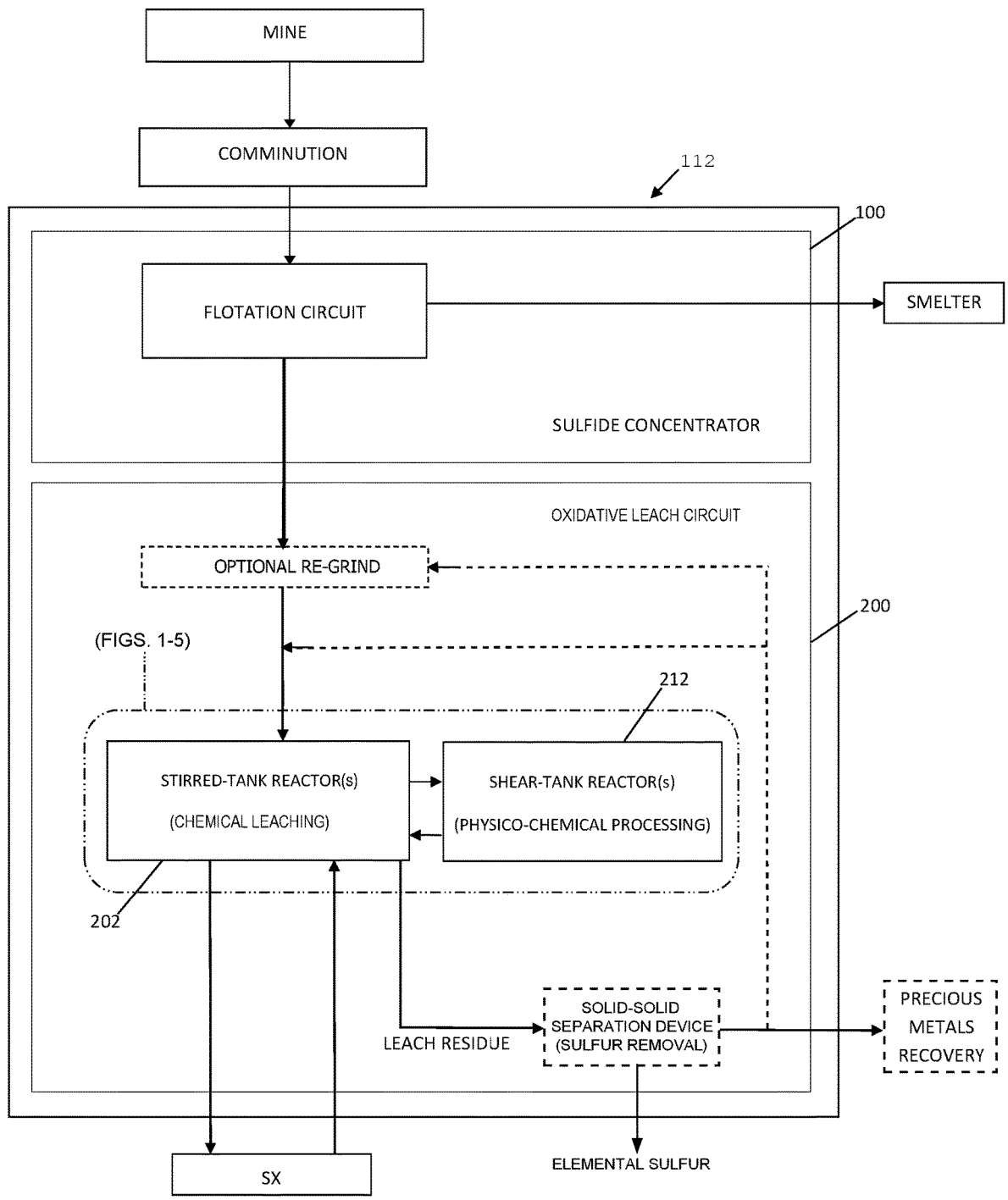
FIG. 13 is a schematic diagram illustrating, in more detail, a portion of the non-limiting, exemplary metal recovery flowsheet shown in FIG. 12.

Slurry 19, 27 containing pregnant leach solution (PLS) and leach residue created during the atmospheric or substantially atmospheric leaching of the metal sulfide concentrate may be filtered, and the PLS may be sent from the oxidative leach circuit 200 to a downstream solvent extraction/electrowinning (SX/EW) circuit as shown in FIGS. 12 and 13.

Raffinate 72 may be recycled from the respective downstream solvent extraction/electrowinning (SX/EW) circuit, and sent back to the oxidative leach circuit 200. Leach residues within streams 19, 27 may be sent to a precious metals recovery circuit and/or ultimately to a leach residues disposal area as suggested by FIG. 12. While not expressly shown, leached residue sulfur may be internally or externally processed/recovered/removed, in order to create sulfuric acid which can re-supply the oxidative leach circuit 200 or be sold to offset costs.

A flotation concentrate produced in the sulfide concentrator 100 may be optionally re-ground, dewatered, re-pulped with an acidic solution in a re-pulp tank, and then conditioned in at least one pre-conditioning tank prior to oxidative leaching in an oxidative leach circuit 200. FIG. 1 suggests a dewatered concentrate 1 entering a re-pulp tank (labeled "Repulp"), wherein additional acid and/or oxygen (not shown) may be added to the re-pulp tank. Re-pulped concentrate 2 may enter a first conditioning tank (labeled "Cond1"), which may have sparging means equipped to sparge oxygen, oxygen enriched air or air 301. Raffinate 72 from a downstream solvent extraction (SX) circuit, may be fed to the first conditioning tank as shown. Preconditioned re-pulped concentrate 4 may move directly to a stirred-tank reactor 202 or shear-tank reactor 212 within the oxidative leaching circuit 200, or to an optional second conditioning tank (labeled "Cond2") to produce a twice-preconditioned re-pulped concentrate 7 to reduce short circuiting, without limitation. A gas, liquid, or a gas/liquid combination 302, such as oxygen, air, compressed oxygen, and/or various combinations thereof, may be introduced into the second conditioning tank as shown, similarly to the first conditioning tank. The preconditioning tanks allow for adjustment of redox potential, and the stripping of non-volatile gases, like nitrogen and carbon dioxide, from the feed slurry prior to oxidative leaching A series of stirred-tank reactors 202 configured as oxidative leach reactors (labeled "Leach1", "Leach2", "Leach3", "Leach4") may be provided in series to leach metal (e.g., copper) from the preconditioned re-pulped concentrate 4 into solution. According to some embodiments, the stirred-tank reactors 202 are preferably configured as open atmospheric conventional stirred-tank reactors (CSTRs).

A gas, liquid, or gas/liquid combination 304, 306, 308, 310, such as oxygen, air, compressed oxygen, and/or various combinations thereof, may be introduced into any of the stirred-tank reactors 202. The rate, amount, or composition of the gas, liquid, or gas/liquid combination 304, 306, 308, 310 may be the same or different between respective stirred-tank reactors 202. For example, in some embodiments, a rate, amount, or composition of the gas, liquid, or gas/liquid combination 304, 306, 308, 310 may gradually change as the continuous oxidative leach circuit 200 progresses downstream. Moreover, the rate, amount, or composition may abruptly change between a stirred-tank reactor 202 and an adjacent preceding or succeeding stirred-tank reactor 202.

Slurry 8, 11, 14, 19 leaving a stirred-tank reactor 202 may enter an adjacent shear-tank reactor 212, before entering the next adjacent downstream stirred-tank reactor 202 as shown. A rate, amount, or composition of gas, liquid, or gas/liquid combination 305, 307, 309 may be introduced into any one or more of the shear-tank reactors 212; and the rate, amount, or composition may be the same, or may be different for each shear-tank reactor 212. As can be gleaned by comparing FIG. 1, FIG. 2, and FIG. 5, shear-tank reactors 212 may be placed in series with stirred-tank reactors 202 (i.e., in an inter-stage configuration suggested by FIG. 1), in parallel with stirred-tank reactors 202 (i.e., in an intra-stage configuration suggested by FIG. 2), within stirred-tank reactors 202 (i.e., in an in-situ configuration suggested in FIG. 5), and/or various combinations and permutations thereof (not shown), without limitation. Slurry 10, 13, 16 exiting an upstream shear-tank reactor 212 may be fed into a downstream stirred-tank reactor 202 in succession as shown.

Slurry 19 leaving a final processing stage within the oxidative leach circuit 200 may enter into a CCD circuit (not shown), where tails can be discarded, and decanted liquor may undergo an additional solid/liquid separation step to clarify pregnant leach solution ("PLS"). Though not shown, in some instances, a solid/solid separation apparatus for separating the elemental sulfur reaction product from unreacted particles within the slurry 19 may precede the CCD circuit. In this configuration, the unreacted particles within slurry 19 can be recycled back to the optional regrind circuit (see FIG. 13) upstream of the oxidative leach circuit 200, and/or may additionally be recycled to a preceding reactor 202, 212 or conditioning tank (Cond1, Cond2), without limitation. The PLS may enter a holding tank prior to being delivered to a solvent extraction (SX) circuit where it might be processed through one or more mixer settlers. Raffinate 72 from the solvent extraction circuit may be split, and a portion may be recycled upstream to one or more of the conditioning tanks, stirred-tank reactors, and/or shear-tank reactors, without limitation. Delivery of the raffinate 72 may be made via sparging means or in a conventional manner.

In some embodiments, it may be preferable to control the rate of attrition, grinding, fracturing, and/or crystal lattice structure changes of slurry particles within the shear-tank reactors 212, in such a way that said rate of attrition, grinding, fracturing, and/or crystal lattice structure changes approximately matches chemical leach rates in the stirred-tank reactors 202 and/or stabilizes redox potential. In this regard, initial, pseudo-zero order leach rates may be possible as will be appreciated from co-pending applications and from FIG. 7. While the exact mechanism of conversion of compositions within the shear-tank reactors is, at this time, not entirely known, the inventors believe that mechano-chemical/physico-chemical inter-particle interactions occur due to shear imparted between particles, and these mechano-chemical/physico-chemical inter-particle interactions might stress outer chalcopyrite portions, thereby enhancing electrochemical interactions.

Figure 11:
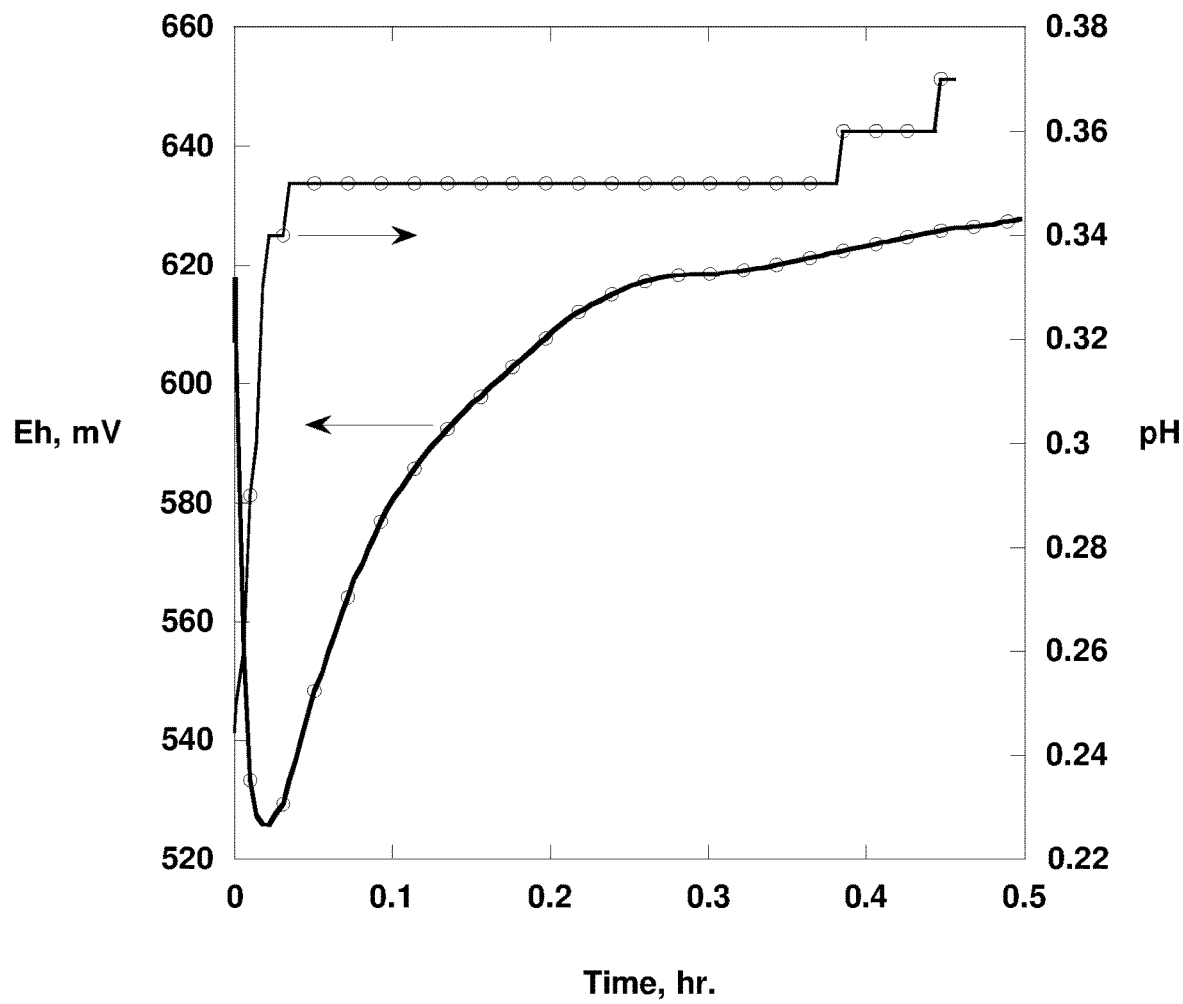

FIG. 11 illustrates this point for the oxidative leaching of chalcopyrite, wherein a significant amount of Cu dissolution takes place without any net consumption of $H_2SO_4$ as demonstrated by the lack of change in pH. Furthermore, the lack of change in pH during the early stages of chalcopyrite dissolution likely means that the oxidation of sulfur substantially matches the rate of ferrous oxidation according to the following series of reaction steps:

$$CuFeS_2+2Fe(SO_4)_3 \rightarrow CuSO_4+5FeSO_4+2S$$

$$4FeSO_4+O_2+2H_2SO_4 \rightarrow 2Fe_2(SO_4)_3+2H_2O$$

$$2S+3O_2+2H_2O \rightarrow 2H_2SO_4$$

Figure 2:
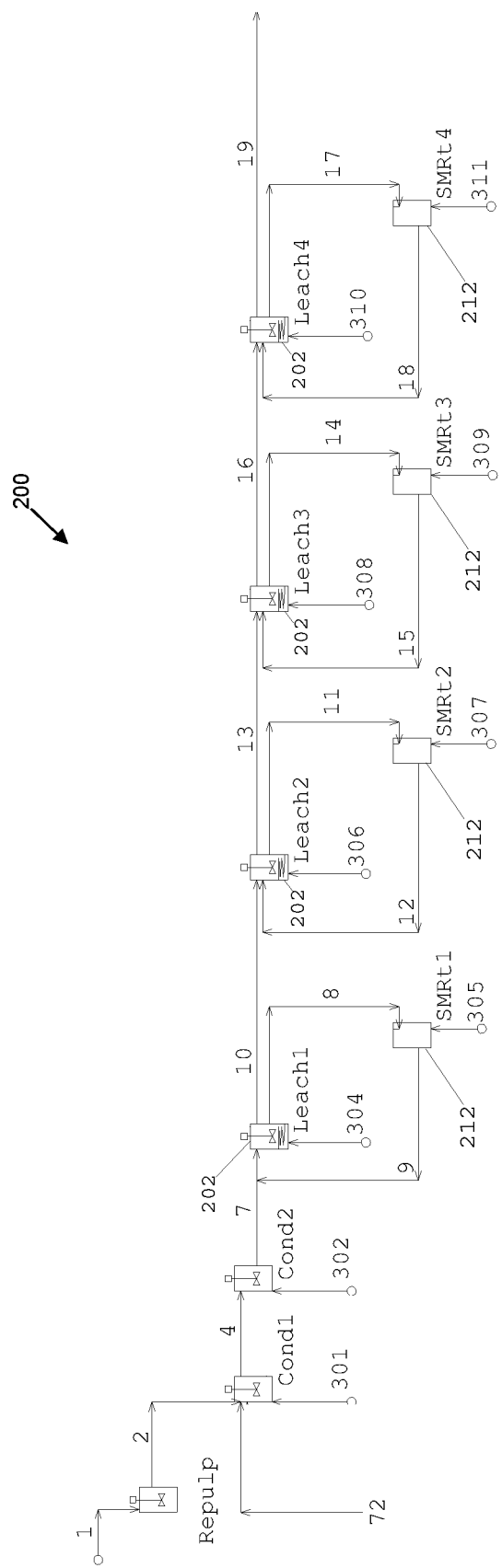
FIG. 2 is a schematic diagram illustrating a non-limiting, exemplary continuous oxidative leach circuit portion of a metal recovery flowsheet which might employ certain aspects of the invention, wherein novel shear-tank reactors may be disposed in parallel; in other words, a shear-tank reactor within an oxidative leach circuit may receive leach slurry from a respective stirred-tank reactor and may re-feed the same respective stirred-tank reactor. The oxidative leach circuit may, as shown, comprise at least one pre-conditioning tank.

FIG. 2 is a schematic diagram illustrating a non-limiting, exemplary embodiment of an oxidative leach circuit 200 comprising novel shear-tank reactors 212 disposed in a parallel arrangement with stirred-tank reactors 202. As shown, each shear-tank reactor 212 may communicate with a respective stirred-tank reactor 202 in an intra-stage configuration. In some preferred embodiments, the oxidative leach circuit 200 may be adequately configured to leach copper. As shown, the oxidative leach circuit 200 may comprise at least one pre-conditioning tank, wherein fine grinding steps are preferably performed well upstream of the oxidative leach circuit 200. The provided oxidative leach circuit 200 differs from the oxidative leach circuit in FIG. 1 in that slurry 8, 11, 14, 17 leaving an stirred-tank reactor 200 enters a respective shear-tank reactor 212, which processes the received slurry under high shear conditions, and then returns the high-shear processed slurry 9, 12, 15, 18 back to the same respective stirred-tank reactor 202 from which it received the slurry. Similar to what is suggested in the embodiment shown in FIG. 1, a rate, amount, or composition of gas or liquid, or gas/liquid combination 305, 307, 309, 311 may be introduced into any one or more of the shear-tank reactors 212 shown in FIG. 2.

Each shear-tank reactor 212 is preferably configured to: a) receive slurry from an atmospheric or substantially atmospheric stirred-tank reactor 202, b) process the slurry received from the atmospheric or substantially atmospheric stirred-tank reactor 202 under high shear conditions, preferably at high solids concentrations and optionally at an oxygen overpressure between about 1 and 5 bar, and c) deliver the shear-processed slurry back to the atmospheric or substantially atmospheric stirred-tank reactor 202. Though a single shear-tank reactor 212 is shown to be operatively connected to a single stirred-tank reactor 202, it is anticipated that more than one shear-tank reactor 212 may be operatively connected to a single stirred-tank reactor 202, without limitation.

Figure 3:
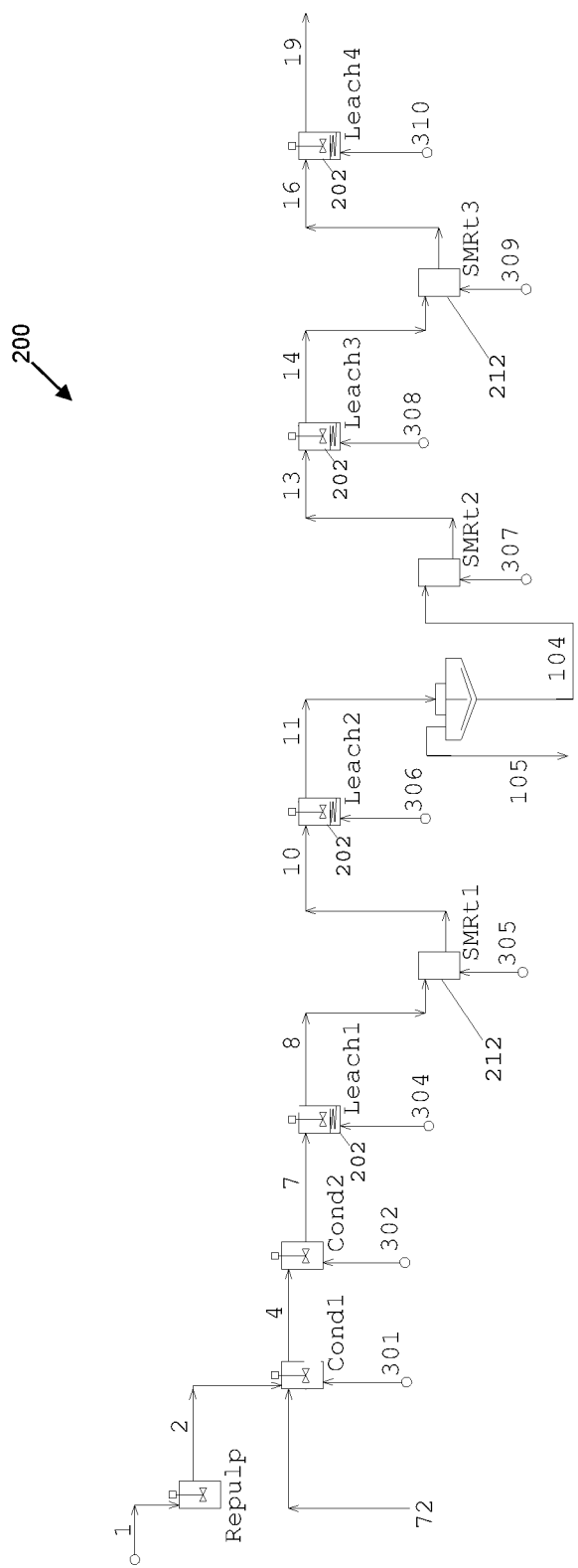
FIG. 3 is a schematic diagram illustrating a non-limiting, exemplary continuous oxidative leach circuit portion of a metal recovery flowsheet which might employ certain aspects of the invention. As shown, the oxidative leach circuit may comprise a solid-liquid separation step, preferably mid-process, to help prevent copper concentration buildup.

FIG. 3 is a schematic diagram illustrating a non-limiting, exemplary oxidative leach circuit 200 which might employ certain aspects of the invention, wherein the oxidative leach circuit 200 has similarities with FIG. 1 and/or FIG. 2, but may further comprise one or more solid-liquid separation steps within the oxidative leach circuit 200 to prevent or mitigate an over-buildup of metal concentrations (e.g., mitigate copper concentration and trace impurities buildup). For example, as shown in FIG. 3, slurry 11 exiting an stirred-tank reactor 212 (e.g., leach stage labeled "Leach2") may be processed by a solid/liquid separation device, wherein a solid fraction 104 produced by the solid/liquid separation device may proceed to subsequent leaching within the oxidative leach circuit 200 and wherein a liquid fraction 105 may move downstream to a solvent extraction and/or CCD circuit, without limitation. As non-limiting examples, the solid/liquid separation device may comprise any one or more of: a thickener, a clarifier, a filter, and a screen, without limitation. Other conventional devices capable of dewatering or separating a solid from a liquid are anticipated.

Figure 4:
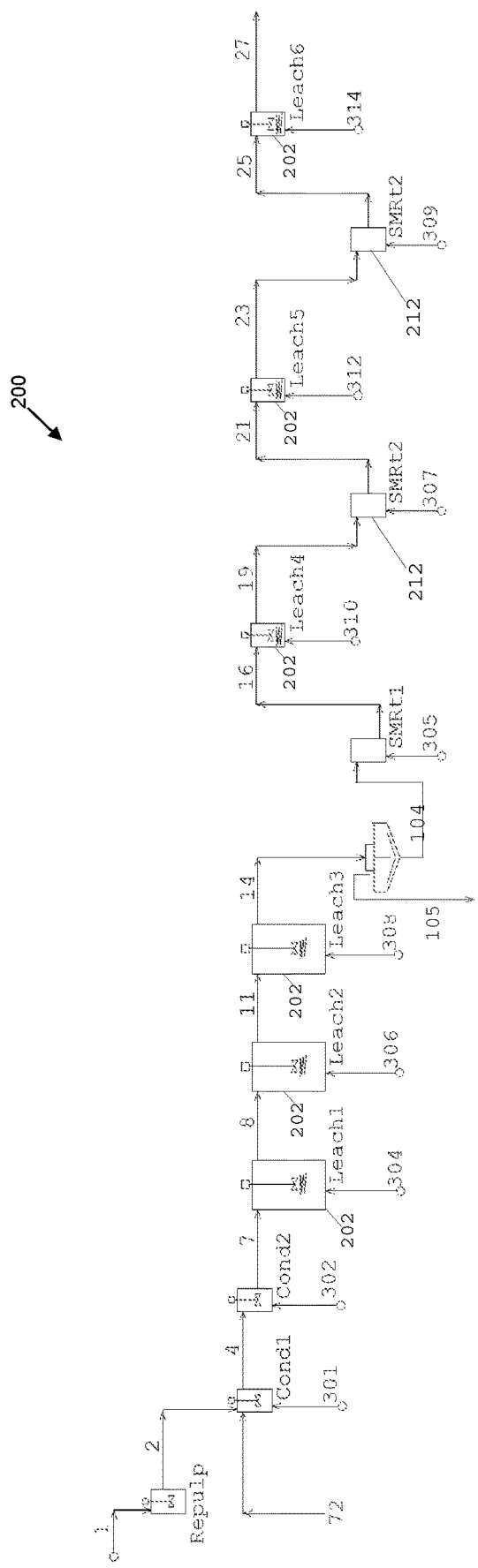
FIG. 4 is a schematic diagram illustrating a non-limiting, exemplary continuous oxidative leach circuit portion of a metal recovery flowsheet which might employ certain aspects of the invention. As shown, the oxidative leach circuit may comprise a number of larger stirred-tank reactors within a first portion of an oxidative leach circuit, followed by a solid-liquid separation step to help prevent copper concentration buildup; wherein downstream of solid-liquid separation apparatus, a number of smaller stirred-tank reactors interposed between a number of shear-tank reactors is employed.

FIG. 4 is a schematic diagram illustrating a non-limiting, exemplary oxidative leach circuit 200 which might employ certain aspects of the invention. As shown, the oxidative leach circuit 200 may comprise a number of large stirred-tank reactors 202 for implementing a number of leach stages (labeled "Leach1", "Leach2", "Leach3") within a first portion of the oxidative leach circuit 200, followed by a solid-liquid separation step to help prevent copper concentration buildup. Downstream of the solid-liquid separation step, a number of smaller stirred-tank reactors 202 interposed between a number of shear-tank reactors 212 may be provided. As shown, the shear-tank reactors 212 may be placed in series with the stirred-tank reactors 202; however various configurations of inter-stage, intra-stage, and in-situ placement may be employed, without limitation. The number of large stirred-tank reactors 202 may be any, but is preferably at least between one and four. The number of smaller downstream stirred-tank reactors 202 (leach stages labeled "Leach4", "Leach5", and "Leach6") may be any, but is preferably at least between one and four. The relative volumetric ratio between one of the large stirred-tank reactors and one of the smaller stirred-tank reactors may be between approximately 1.1:1 and about 10:1. In some preferred embodiments, the relative volumetric ratio between one of the large stirred-tank reactors and one of the smaller stirred-tank reactors may be between approximately 2:1 and about 5:1, for example about 2:1, without limitation.

As shown, in some embodiments, no shear-tank reactors 212 may be provided within the oxidative leach circuit 200 upstream from the solid-liquid separation device(s) used in the solid-liquid separation step. However, it is anticipated that one or more shear-tank reactors 212 could additionally be employed upstream of the solid liquid separation device (s) and therefore communicate with one or more of the large stirred-tank reactors 202 shown, in any of the manners disclosed herein. As shown, in some embodiments, shear-tank reactors 212 may be provided in series with the smaller stirred-tank reactors 202 downstream of the solid-liquid separation device(s). While not shown, one or more shear-tank reactors 212 may be provided in parallel with the smaller stirred-tank reactors 202 in an intra-stage configuration, without limitation. It may be understood that as more stirred-tank reactors 202 (e.g., Leach5, Leach6) are added to the oxidative leach circuit 200, more heat exchangers 34, 36 may be employed. Moreover, as more stirred-tank reactors 202 are added to the oxidative leach circuit 200, more gas, liquid, or gas/liquid combinations 312, 314 may be employed as necessary; and more slurry feed and/or output streams 21, 23, 25, 27 may be provided as necessary.

Figure 5:
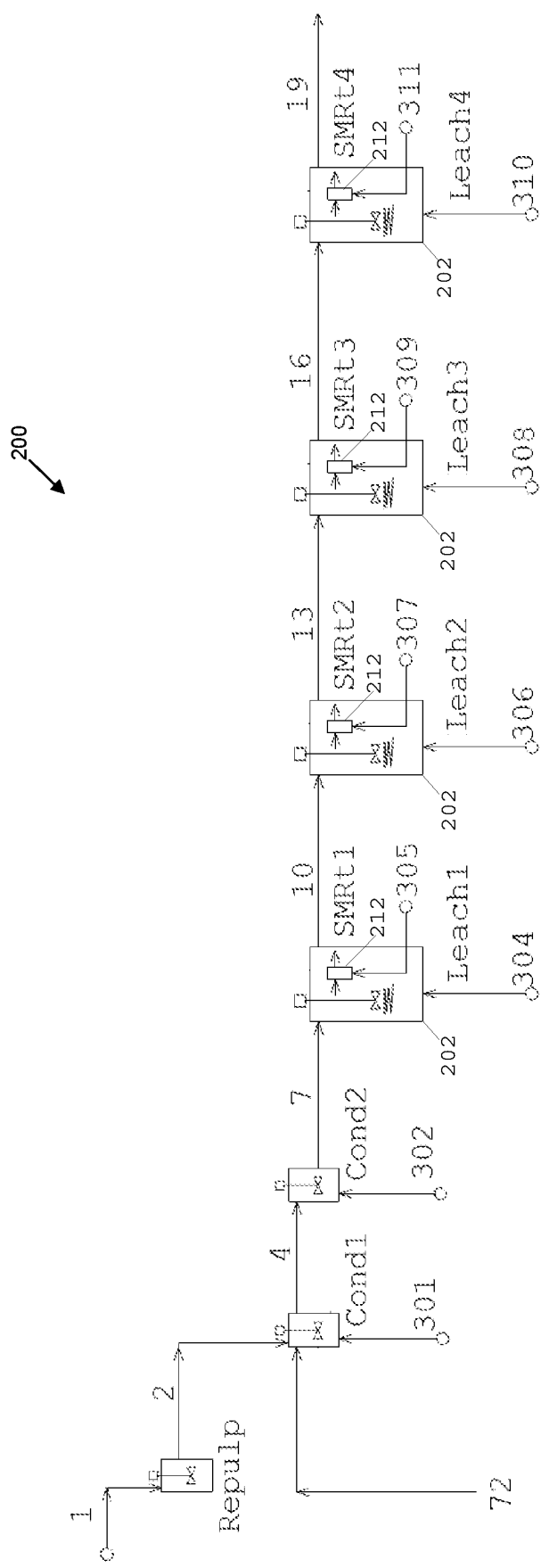
FIG. 5 is a schematic diagram illustrating a non-limiting, exemplary continuous oxidative leach circuit portion of a metal recovery flowsheet which might employ certain aspects of the invention. As shown, the oxidative leach circuit may comprise a stirred-tank reactor having at least one shear-tank reactor disposed therein, in-situ. A number of the hybrid devices may be operatively connected in series (as shown), and/or they may be arranged in a parallel configuration (not shown), without limitation.

FIG. 5 is a schematic diagram illustrating a non-limiting, exemplary embodiment of an oxidative leach circuit 200 employing yet further inventive aspects of the invention. As shown, a leach circuit 200 comprising one or more stirred-tank reactors 202 may be employed; wherein at least one of the one or more stirred-tank reactors 202 further comprises at least one shear-tank reactor 212 disposed therein. Each shear-tank reactor 212 which is disposed within a stirred-tank reactor 202 may comprise an inlet for receiving slurry from within the tank of the respective stirred-tank reactor 202, and an outlet for dispersing shear-processed slurry back into the tank of the respective stirred-tank reactor 202.

While not expressly shown, it is envisaged that multiple shear-tank reactors 212 may be provided within a single stirred-tank reactor 202 to accommodate larger tankage. For example, multiple shear-tank reactors 212 may be provided within a single stirred-tank reactor 202 and operate as individual stand-alone devices. While not shown, it is also envisaged that multiple shear-tank reactors 212 may be provided within a single stirred-tank reactor 202 and coupled together in series. For example, a stirred-tank reactor 202 may house a first in-situ shear-tank reactor 212 and a second in-situ shear-tank reactor 212 within its tank vessel, without limitation. An inlet of the first in-situ shear-tank reactor 212 may receive slurry from the tank of the stirred-tank reactor 202, and an outlet of the first in-situ shear-tank reactor 212 may convey provisionally shear-processed slurry from the outlet of the first in-situ shear-tank reactor 212 to the inlet of the second in-situ shear-tank reactor 212. Twice-processed slurry may leave the outlet of the second in-situ shear-tank reactor 212 and subsequently be re-introduced into the tank of the stirred-tank reactor 202. A number of the hybrid stirred-tank reactor/shear-tank reactor devices may be strung together in series as shown, or in a parallel configuration (not shown), to form an oxidative leach circuit 200, without limitation.

Figure 6:
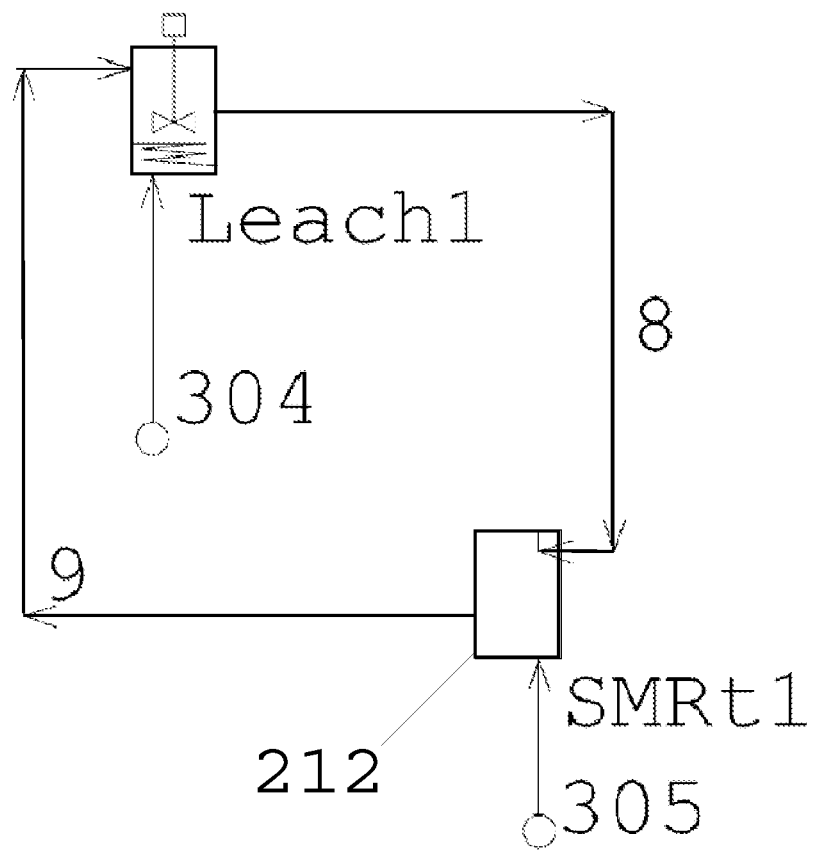
FIG. 6 is a schematic diagram illustrating a non-limiting exemplary oxidative leach circuit which may be used to obtain batch leach test measurements.

FIG. 6 is a schematic diagram illustrating a non-limiting exemplary oxidative leach circuit which may be used to obtain batch leach test measurements in accordance with some embodiments. As will be described hereinafter and may appreciated from the following accompanying examples, the non-limiting exemplary circuit shown in FIG. 6 may be utilized for various experiments and bench-scale testing, without limitation.

Figure 14:
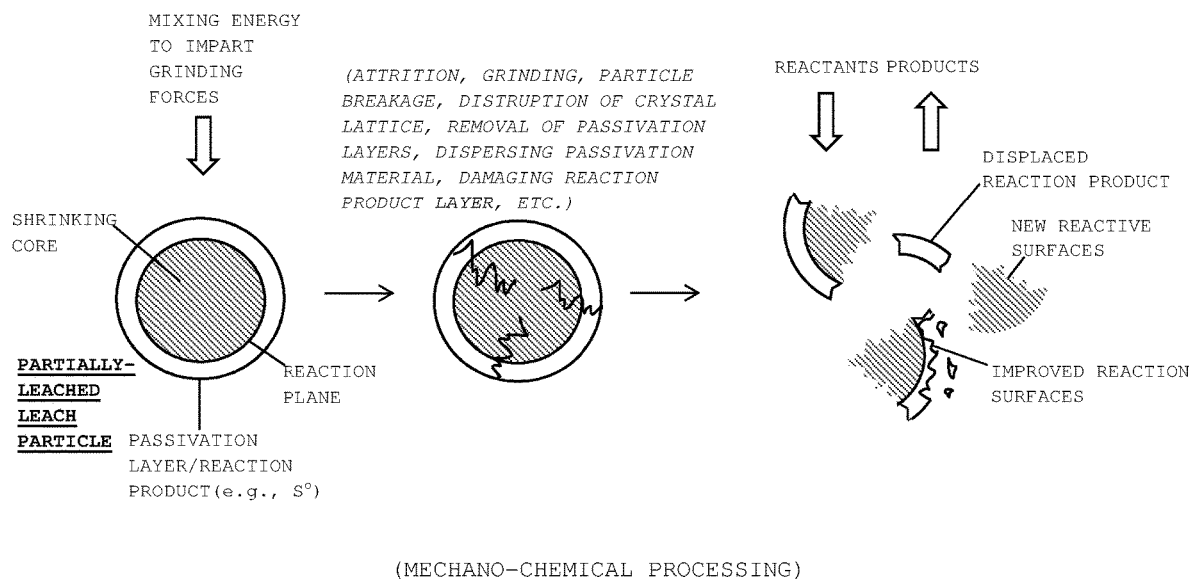
FIG. 14 schematically depicts mechano-chemical processing which may occur in a shear-tank reactor according to some embodiments.

FIG. 14 suggests mechano-chemical processing which may occur in a shear-tank reactor 212 according to some embodiments. Mechano-chemical processing may occur within a shear-tank reactor 212 independently, or in combination with the physico-chemical processing illustrated in FIG. 15.

Figure 15:
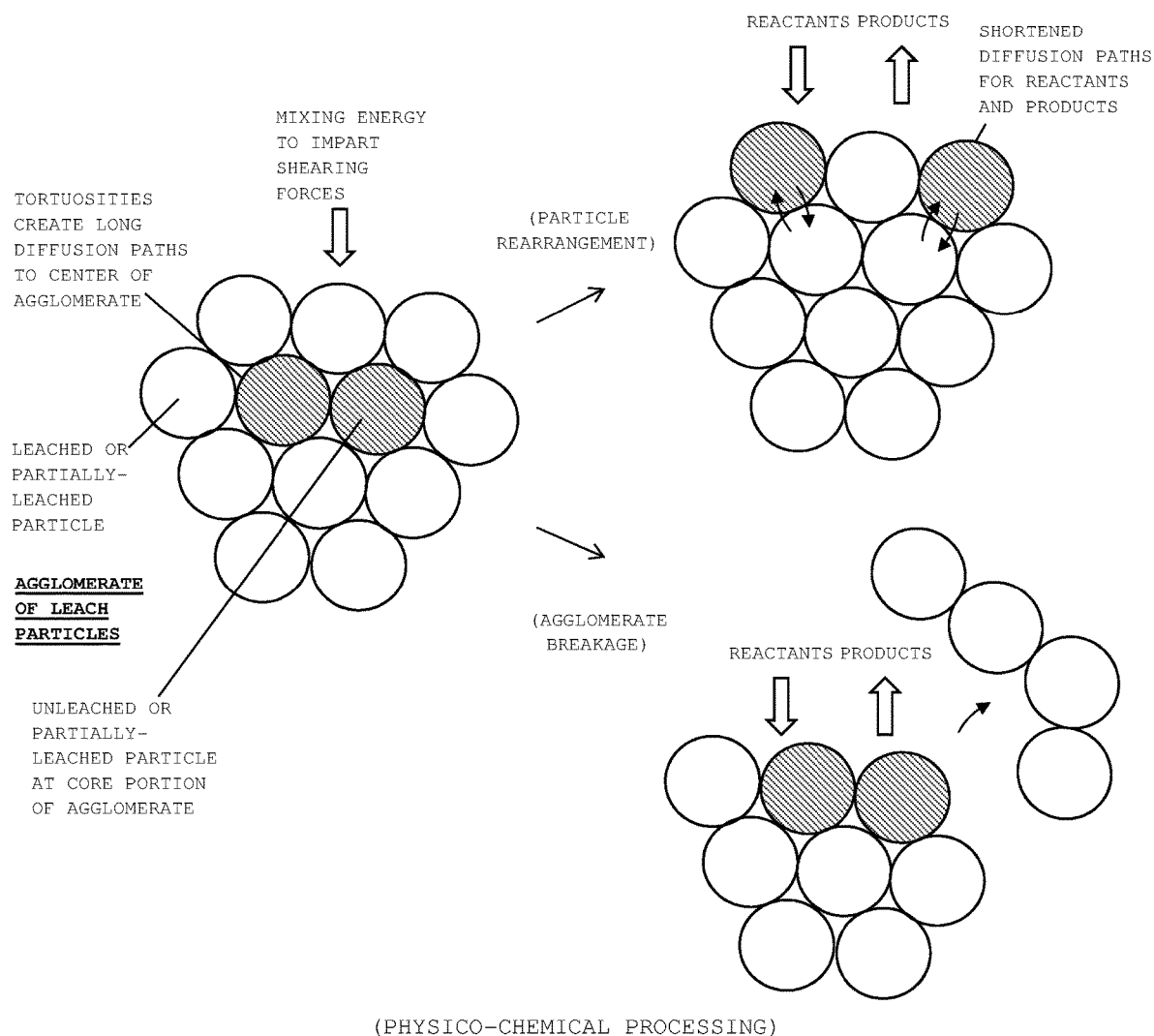
FIG. 15 schematically depicts physico-chemical processing which may occur in a shear-tank reactor according to some embodiments.

FIG. 15 suggests physico-chemical processing which may occur in a shear-tank reactor 212 according to some embodiments. Physico-chemical processing may occur within a shear-tank reactor 212 independently, or in combination with the mechano-chemical processing illustrated in FIG. 14. Shear energy is supplied in sufficient amounts to ensure agglomerate breakage and particle rearrangement.

As shown, particles residing within a core portion of an agglomeration will have a longer diffusion path length than particles at surface portions of the agglomeration. Accordingly, the particles residing within a core portion may be depleted of reactants. Moreover, this retards product transport. As a result, pH or Eh control is lost.

A shear-tank reactor 212 may synergistically disrupt particle-particle agglomerations (for example agglomerations resulting from a production of a hydrophobic elemental sulfur reaction product at the surfaces of the reacting particles within a stirred-tank reactor 202, without limitation). A shear-tank reactor 212 may also synergistically re-arrange particle-particle agglomerations during leaching stages. Disruptions of particle-particle agglomerations may comprise breaking up of particle-particle contacts within a particle-particle agglomeration, partial fracturing of, or complete destruction of an agglomeration. Though agglomerations may grow, change, or reform after a disruptions induced by a shear-tank reactor 212 (e.g., after de-agglomeration, fracture, or rearrangement of particles caused by grinding media, a high-shear impeller, or a high shear rotor and stator provided to a shear-tank reactor 212), continued intermittent disruption of agglomerations by virtue of the mechanics of the shear-tank reactor 212 may help improve leach kinetics and metal recovery due to continued or periodic alterations (e.g., shortening) of diffusion path lengths to and from reaction planes for unleached or partially-leached particles.

In the following, the invention will be described in more detail with reference to drawings in conjunction with exemplary embodiments and below examples.

Example 1

This Example illustrates the leaching of a chalcopyrite flotation concentrate assisted by the use of a shear-tank reactor under oxidative conditions. In this particular example, the shear-tank reactor was configured as a stirred media reactor and was provided with grinding media therein. The chalcopyrite flotation concentrate, having a P80 of 61 μm and P95 of 104 μm, was leached in an acidic ferric sulfate lixiviant. The primary mineralogy of the sample was: 59% chalcopyrite, 37% pyrite, 2% quartz, and 1% molybdenite. The concentrate was leached in a temperature-controlled, stirred-tank reactor with the assistance of the shear-tank reactor. The concentrate slurry was recirculated continuously between the stirred-tank reactor and the shear-tank reactor as depicted in FIG. 6. Greater than 98% copper dissolution was achieved in 6 hours with a slurry density of 7.5%, leach temperature of 80° C., and 20 g $L^{-1}$ iron (initial slurry Eh was 800 mV (SHE)). The active volumetric ratio between the stirred-tank reactor and the shear-tank reactor was approximately 23.

As the redox potential of the slurry dropped during the course of the leach test, oxygen was sparged into the stirred reactor to maintain a minimum redox potential of 650 mV. The energy input to the shear-tank reactor during the course of the leach test was approximately 100 kW·h/tonne. The mixing energy in the stirred-tank reactor was approximately 1-5 kW·$m^{-3}$.

Figure 7:
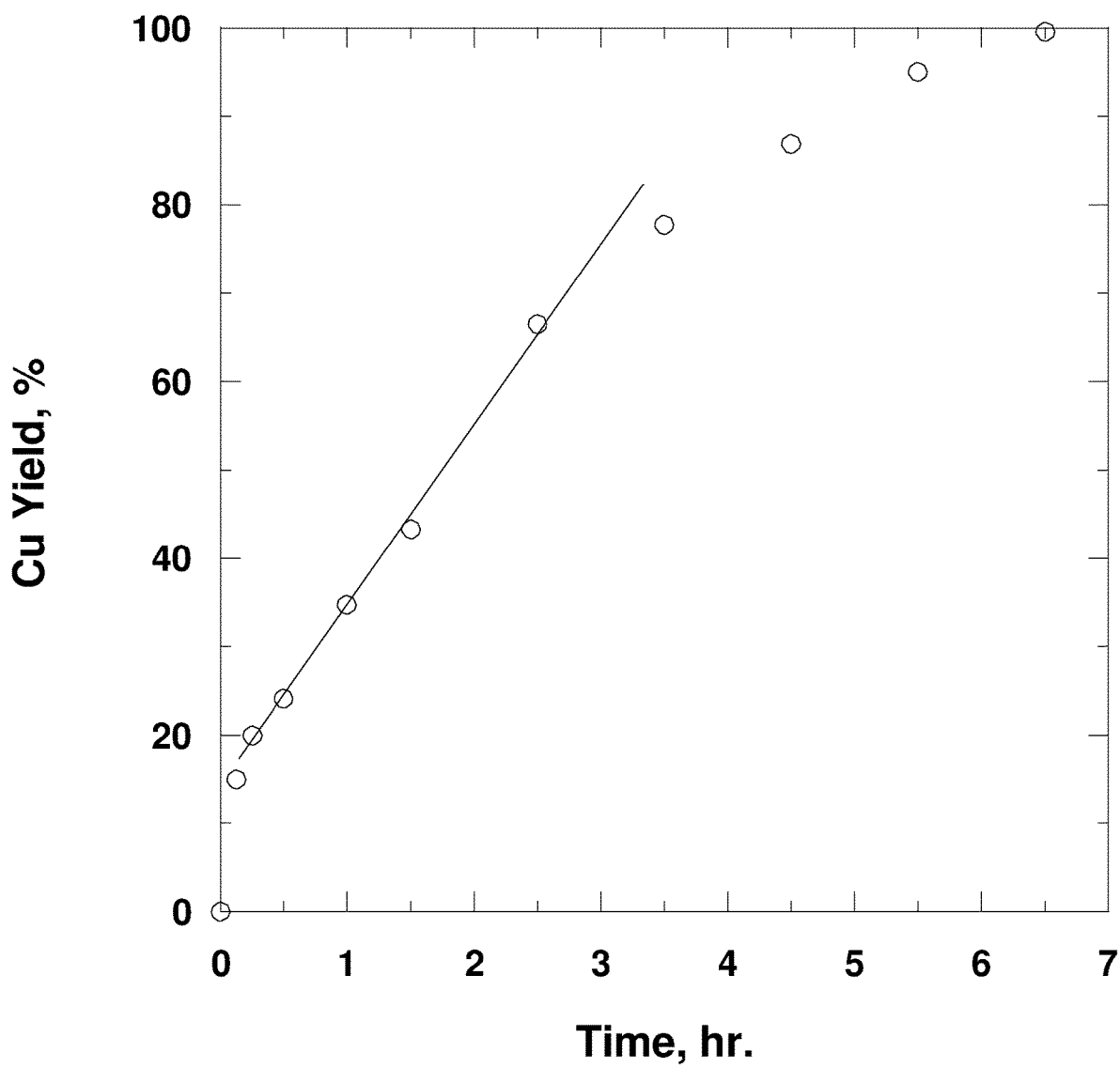
FIGS. 7-11 illustratively show results obtained via bench-scale testing using the oxidative leach circuit shown in FIG. 6.

The copper leach results, according to this exemplary embodiment of the inventive method, are shown in FIG. 7. Overall, the leach curve approximates the classic parabolic curvature, which is characteristic of chalcopyrite leach systems and suggests that the leach rate may be controlled by hindered diffusion through a reaction product layer. Notably, there is an intermediate period, between about 15 min. and up to about 2.5 hours, wherein the copper dissolution rate is pseudo zero order with respect to $Fe^{3+}$. This regime is highlighted by the straight line drawn through this portion of the leach curve.

Figure 8:
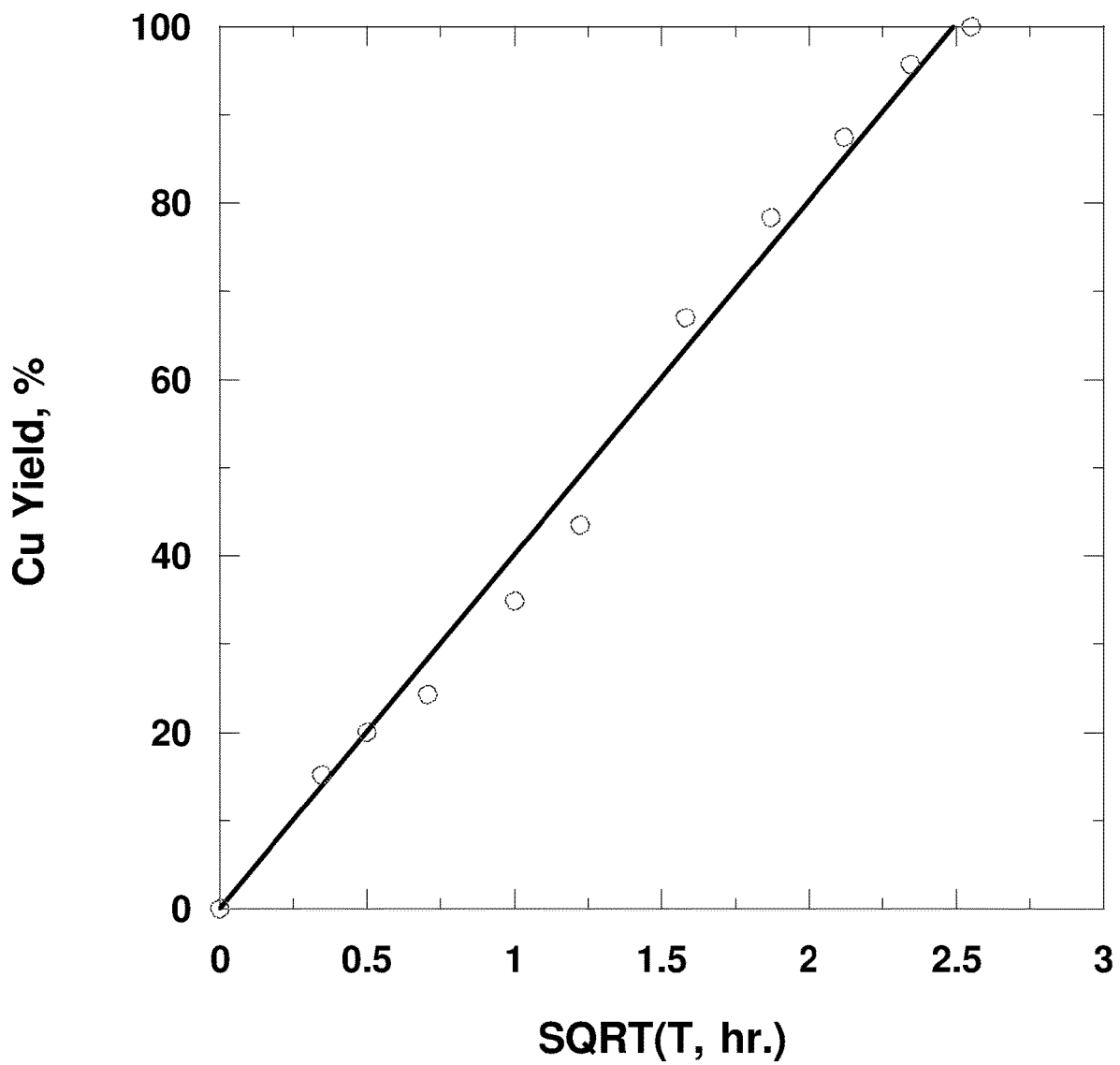

Replotting the copper recovery data as a function of the square root of time (see FIG. 8) produces a straight-line plot with zero copper recovery at time=0. This further suggests a leach mechanism that is controlled by a diffusion process throughout the entire period of Cu dissolution.

Accordingly, the combination of a stirred-tank reactor with a shear-tank reactor in an oxidative leach circuit appears to provide rapid leach rates at an overall low energy input, without the electrochemical passivation problems encountered with past methods.

Example 2

This non-limiting Example illustrates a particular embodiment of the invention wherein a shear-tank reactor may be used to produce a Mechano-Chemical and/or Physico-Chemical catalytic effect at the atomic level—specifically the accelerated oxidation of ferrous to ferric during the dissolution of copper from chalcopyrite. In this particular example, the shear-tank reactor was also configured as a stirred media reactor comprising grinding media.

The oxidative leaching of chalcopyrite ($CuFeS_2$) is believed to be mediated by $Fe^{3+}$ ions which function as the active oxidant according to the equation:

$$CuFeS_2 + 4Fe^{3+} \rightarrow Cu^{2+} + 5Fe^{2+} + 2S^\circ$$

The ferric oxidant is most conveniently regenerated within the leach slurry by the addition of oxygen during the course of the leach process. Alternatively, an oxygen-containing gas including, but not limited to air can be used. The half-cell redox reactions involved in regenerating the active oxidant are:

$$4Fe^{2+} \rightarrow 4Fe^{3+} + 4e^-$$

$$O_2 + 4H^+ + 4e^- \rightarrow 2H_2O$$

However, oxidation rates of ferrous ion in acidic sulfate media by oxygen under atmospheric conditions are known to be slow. This is primarily due to the low solubility of $O_2$ in acidic sulfate media and poor $O_2$ mass transfer rates under atmospheric conditions.

Copper ions in solution are known to accelerate the oxidation of $Fe^{2+}$, but nevertheless, oxidation rates of ferrous ion at 2-5 g ferrous oxidized per L of slurry per hour are the limits of prior art methods operating at atmospheric pressures (see U.S. Pat. No. 5,993,635, column 7, lines 3-5). Processes which accelerate this reaction to levels greater than prior art methods (especially under atmospheric conditions) would be advantageous.

In this Example, a chalcopyrite concentrate was ground prior to leaching in a 10 L FLSmidth® VXPmill™ vertical stirred fine-grinding mill, to produce a leach feed concentrate having a particle size distribution with a P80 of about 16 µm and a P95 of about 30 µm. The concentrate's mineralogy was approximately: 53% chalcopyrite, 33% pyrite, and 13% quartz. Chalcopyrite was the only detectable copper-containing mineral present in the concentrate.

The ground concentrate was leached in a stirred-tank reactor using an acidic ferric sulfate lixiviant. The slurry was recirculated continuously between the stirred-tank reactor and the shear-tank reactor as depicted in FIG. 6. Greater than 98% copper dissolution was achieved in 6 hours with a slurry density of 7.5 wt % and a leach temperature of 80° C. Initially present were 2 g $L^{-1}$ $Cu^{2+}$ and 20 g $L^{-1}$ iron (initial slurry Eh was 658 mV). The energy input to the shear-tank reactor during the course of the leach test was approximately 100 kW·h/tonne.

Figure 9:
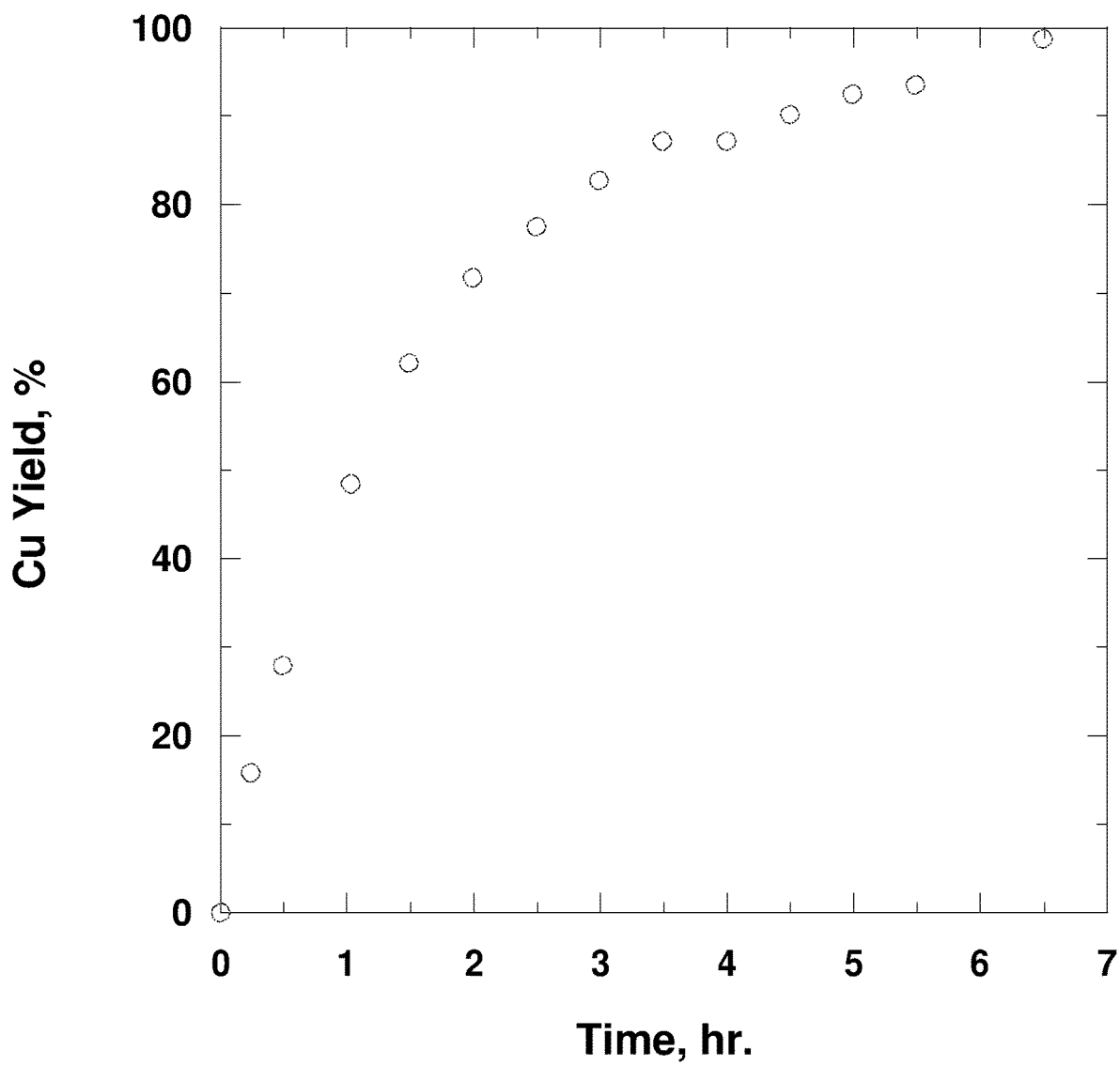

The copper dissolution test results are shown in FIG. 9. This Example shows that initial particle size has little effect on the overall leach time to reach greater than 98% copper recovery. The leach recovery curve is virtually identical to the results presented in FIG. 7 of Example 1. Thus, initial particle size distribution may not be considered as contributing significantly to the rate-controlling step during copper dissolution using this process and method.

During the first hour of the leach test, approximately 109 g of copper was dissolved from chalcopyrite. This amount of copper dissolution would have required the production of approximately 6.87 mol $Fe^{3+}$ over the course of an hour, to support the observed leach rate. Using the Nernst Equation, we estimate that there was only 0.036 mol $Fe^{3+}$ initially present in the leach lixiviant. Taking into account the amount of $Fe^{3+}$ present initially, the amount of copper dissolved would require the oxidation of an additional 6.84 mol $Fe^{2+}$ to $Fe^{3+}$ at the rate of 33.4 g $Fe^{2+}$ oxidized per L per hour. This ferrous oxidation rate is about 5 to 15 times faster than the prior art methods described in U.S. Pat. No. 5,993,635.

Example 3

Figure 10:
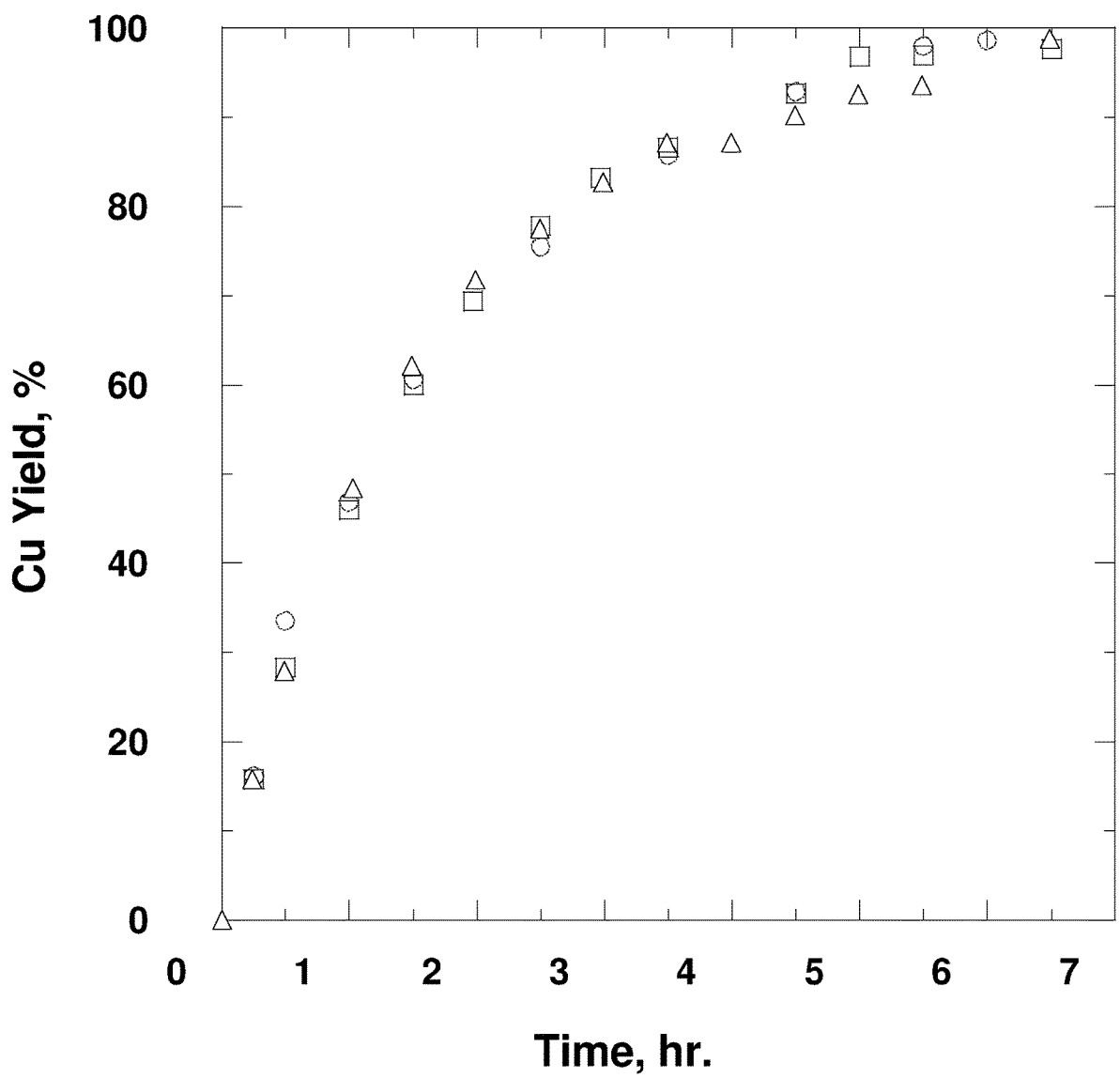

In this Example, duplicate leach tests were run under identical conditions to those in Example 2, except that no copper was present initially in the lixiviant. While $Cu^{2+}$ is known to catalyze the oxidation of $Fe^{2+}$, the data in FIG. 10 suggests that the leach rates can be identical both in the presence and absence of initial copper using embodiments of the inventive processes and methods disclosed herein. Therefore, since the initial presence of copper in Example 2 did not appear to contribute to the rapid oxidation of ferrous to ferric during chalcopyrite leaching, it may be inferred that initial copper/$Cu^{2+}$ may not be necessary according to certain embodiments of the inventive processes and methods disclosed herein.

Example 4

In this Example, the test methods of Example 1 were repeated, except that oxygen sparged into the stirred-tank reactor was turned on during the early stages of the test (i.e., 20 minutes into the test). This ensured a maximum amount of ferric ion availability during the leach. The present method is contrary to prior art methods that are limited by surface passivation involving electrochemical phenomena. Prior art methods have shown that the leaching of chalcopyrite is inhibited at high redox potentials (e.g., above 630-650 mV). See, for example, U.S. Pat. No. 6,277,341 and FIG. 11 contained therein.

In this test, the slurry's initial Eh was adjusted to about 800 mV—well within the expected electrochemical passivation regime for chalcopyrite. Oxygen sparging early on in the leach test was designed to prolong the system's residence within the electrochemical passivation regime to demonstrate an ability to overcome past electrochemical passivation limitations.

According to prior methods, the expectation is that the copper leach rate would be significantly depressed relative to that of Example 1. However, contrary to the teachings of prior art methods, the copper leach rate was instead accelerate, relative to Example 1. In this case, 98% copper dissolution was achieved in just under 4 hours, as compared to 6 hours in Example 1. The faster leach kinetics further reduced the required total mixing energy in the shear-tank reactor from approximately 100 kW·h/tonne to about 66 kW·h/tonne, signaling a potential savings in power consumption. With a power intensity of slightly under 18-25 kW/$m^3$, the shear-tank reactor design used in this Example represents a major departure from prior art regimes (e.g., from the standpoint of a stirred-grinding mill or an attrition scrubber). Nevertheless, the designed shear-tank reactor unit remains unexpectedly more efficient for catalyzing dissolution reactions.

Aside from the more rapid leach kinetics, operating at a higher redox potential appears to lead to a change in the rate-controlling mechanism from oxidation of ferrous and diffusion of ferric, to a mechanism which is surface-reaction controlled.

During the course of the leach test, oxygen was introduced into the stirred-tank reactor, with a total $O_2$ addition of approximately 70 L. The theoretical $O_2$ demand, based on the stoichiometric $O_2$ requirement for ferrous oxidation, was estimated to be 67 L. It should be understood that the apparent $O_2$ utilization efficiency may be skewed due to $O_2$ absorption from the atmosphere into the shear-tank reactor.

Those skilled in the art will instantly recognize and appreciate that further advantages to leach kinetics can be gained by directly introducing enriched oxygen into the shear-tank reactor devices described herein. Moreover, it should be known that the particular features, processes, and benefits which are shown and described herein in detail are purely exemplary in nature and should not limit the scope of the invention. For example, where used herein, and in related co-pending applications referenced herein, the term "atmospheric leach" may comprise leaching under very small amounts of pressure which are close, but not exactly, ambient. In other words, while it is most preferred that "atmospheric" leaching is performed completely open to air, it is anticipated by the inventors that some best modes of leaching using the inventive concepts may incorporate the use of a plurality of stirred-tank reactors which are preferably open to air, and one or more smaller shear-tank reactors which may be pressurizable (e.g., to 1-10 bar) to overcome oxygen transfer limitations or enhance oxygen mass transfer. Accordingly, portions of the oxidative metal sulfide leach may be performed under slight pressure (e.g., in a covered or pressurizable vessel) or completely atmospherically (e.g., in a plurality of non-pressurized stirred-tank reactors), without limitation.

It is further anticipated that in preferred embodiments, most (e.g., up to approximately 95%) of the cumulative oxidative leach time of a metal sulfide leach particle may occur at atmospheric conditions, while less than approximately 5-10% of the cumulative oxidative leach time may occur at or above atmospheric conditions, giving rise to the term "substantially atmospheric" used throughout this description and co-pending applications.

Without departing from the intent of the invention, stirred-tank reactor head space (or the head space of one or more shear-tank reactors) may be atmospheric or alternatively slightly pressurized to above ambient pressure to enhance oxygen mass transfer. The pressure may be controlled by temperature and/or by an applied gas pressure that is above ambient pressure.

It may, in some instances, be desirable to place a shear-tank reactor 212 in series with a stirred-tank reactor 202 in an inter-stage configuration within an oxidative leach circuit 200, in order to achieve one or more of the following technical benefits/effects: refreshing surfaces of metal sulfide leach particles between leaching stages or vessels, de-agglomerating metal sulfide leach particles before entering a subsequent leaching stage or vessel, synergistically disrupting particle-particle agglomeration resulting from a production of a hydrophobic elemental sulfur reaction product at the surfaces of reacting metal sulfide leach particles, or re-arranging metal sulfide leach particle agglomerates to alter the diffusion path length or accelerate mass transfer to and from a reaction plane, without limitation.

It may, in some instances, be desirable to place a shear-tank reactor 212 in parallel with a stirred-tank reactor 202 in an intra-stage configuration within an oxidative leach circuit 200, in order to achieve one or more of the following technical benefits/effects: refreshing surfaces during leaching within a particular leaching stage or vessel, minimizing sulfur buildup within a particular leaching stage or vessel, minimizing the adverse effects of passivation within a particular leaching stage or vessel, de-agglomerating leach particles within a particular leach stage or vessel, or maximizing the efficiency of a particular leaching stage or vessel given the allotted residence time of particles within the particular leaching stage or vessel. For example, such a configuration may find particular utility when preferentially pulling off a sulfur-rich fraction from a stirred-tank reactor.

It may, in some instances, be desirable to place a shear-tank reactor 212 inside of a stirred-tank reactor 202 in an in-situ configuration within an oxidative leach circuit 200, in order to achieve one or more of the aforementioned technical benefits at relatively similar energy consumptions, whilst simultaneously minimizing piping, plumbing, CAPEX, and/or space required to accomplish the same. In some embodiments, it may be desirable to omit portions of a tank or entire tank sections of stirred-tank reactors 212 if they are placed inside of a stirred-tank reactor 202 in an in-situ configuration. For example, if no grinding media is employed, or if oxygen overpressure is not needed, then embodiments of a hybrid stirred-tank reactor 202 and shear-tank reactor 212 may comprise a single tank which houses a first shaft comprising a first impeller driven by a first motor which operates at a first stirring energy, and the single tank may further house one or more second shafts comprising any combination of the following: one or more high shear rotors operable with one or more high shear stators, one or more high shear impellers, and one or more pumping blades. The one or more second shafts may be arranged so as to enter the single tank at an open top portion of the single tank, or, the one or more second shafts may be arranged so as to penetrate the single tank. In some instances, for example, the one or more second shafts may be arranged at lower portions of the single tank. The one or more second shafts may operate at a second shearing energy which is higher than the first stirring energy, without limitation.

It may, in some instances, be desirable to place a solid-liquid separation device in the oxidative leach circuit 200 to achieve the technical benefits/effects of mitigating copper buildup within the oxidative leach circuit 200 and enabling more efficient functioning of one or more shear-tank reactors 212 by operating on a more dense particle slurry It may, in some instances, be desirable to place a solid-solid separation device after the oxidative leach circuit 200 and prior to a CCD or SX/EW circuit, in order to achieve the technical benefit/effect of removing sulfur from unleached particles, so that the unleached particles can repopulate the oxidative leach circuit 200 (see FIG. 13) substantially free of dispersed sulfur.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

The invention claimed is:

1. An oxidative leach circuit comprising at least one stirred-tank reactor and at least one shear-tank reactor configured to impart a higher shear to particles than the at least one stirred-tank reactor; the at least one shear-tank reactor operating at a higher power density than the at least one stirred tank reactor; and the at least one shear-tank reactor comprising a stirred media reactor which comprises grinding media, wherein the at least one stirred-tank reactor and the at least one shear-tank reactor are connected in parallel.

2. An oxidative leach circuit for improving leach kinetics and metal recovery during atmospheric or substantially atmospheric leaching of a metal sulfide, the oxidative leach circuit comprising:
   (a) at least one stirred tank leach reactor; and
   (b) at least one shear-tank reactor configured to impart a greater amount of shear to particles of a metal sulfide than the at least one stirred tank reactor;
   wherein the at least one shear-tank reactor comprises grinding media; and
   wherein the at least one stirred tank leach reactor operates at a first power density and the at least one shear-tank reactor operates at a second power density which is higher than the first power density, the oxidative leach circuit further comprising at least two stirred tank reactors and (c) a solid-liquid separation device disposed between the at least two stirred tank reactors.

3. The oxidative leach circuit of claim 2, wherein the stirred tank reactor downstream of the solid-liquid separation device is volumetrically smaller than the stirred tank leach reactor upstream of the solid-liquid separation device.

4. An oxidative leach circuit for improving leach kinetics and metal recovery during atmospheric or substantially atmospheric leaching of a metal sulfide, the oxidative leach circuit comprising:
   (a) at least one stirred tank leach reactor; and
   (b) at least one shear-tank reactor configured to impart a greater amount of shear to particles of a metal sulfide than the at least one stirred tank reactor;
   wherein the at least one shear-tank reactor comprises grinding media; and
   wherein the at least one stirred tank leach reactor operates at a first power density and the at least one shear-tank reactor operates at a second power density which is higher than the first power density; the oxidative leach circuit further comprising (c) a solid-liquid separation device disposed between the at least one shear-tank reactor and the at least one stirred tank reactor.

5. An oxidative leach circuit for improving leach kinetics and metal recovery during atmospheric or substantially atmospheric leaching of a metal sulfide, the oxidative leach circuit comprising:
   (a) at least one stirred tank leach reactor; and
   (b) at least one shear-tank reactor configured to impart a greater amount of shear to particles of a metal sulfide than the at least one stirred tank reactor;
   wherein the at least one shear-tank reactor comprises grinding media; and
   wherein the at least one stirred tank leach reactor operates at a first power density and the at least one shear-tank reactor operates at a second power density which is higher than the first power density; wherein the at least one shear-tank reactor is disposed between two stirred tank reactors.

6. An oxidative leach circuit for improving leach kinetics and metal recovery during atmospheric or substantially atmospheric leaching of a metal sulfide, the oxidative leach circuit comprising:
   (a) at least one stirred tank leach reactor; and
   (b) at least one shear-tank reactor configured to impart a greater amount of shear to particles of a metal sulfide than the at least one stirred tank reactor;
   wherein the at least one shear-tank reactor comprises grinding media; and
   wherein the at least one stirred tank leach reactor operates at a first power density and the at least one shear-tank reactor operates at a second power density which is higher than the first power density;
   wherein the at least one shear-tank reactor is configured with mechanical means for either:
      i. synergistically disrupting particle-particle agglomerations resulting from a production of a hydrophobic elemental sulfur reaction product at the surfaces of reacting particles, or
      ii. synergistically re-arranging particle-particle agglomerations resulting from a production of a hydrophobic elemental sulfur reaction product at the surfaces of reacting particles; and
   I. wherein synergistically disrupting particle-particle agglomerations comprises breaking particle-particle contacts within a particle-particle agglomeration; or
   II. wherein i) or ii) alters a diffusion path length to and from a reaction plane; or
   III. wherein i) or ii) accelerates mass transfer to and from a reaction plane.

7. A method of leaching comprising:
   (a) providing an oxidative leach circuit comprising at least one stirred-tank reactor and at least one shear-tank reactor; the at least one shear-tank reactor being configured to impart a higher shear to particles than the at least one stirred-tank reactor; the at least one shear-tank reactor operating at a higher power density than the at least one stirred tank reactor; and the at least one shear-tank reactor comprising a stirred media reactor which comprises grinding media;
   (b) processing a flotation concentrate comprising metal sulfide particles within the at least one stirred-tank reactor and the at least one shear-tank reactor;
   (c) forming agglomerations containing said metal sulfide particles within the at least one stirred-tank reactor;
   (d) intermittently disrupting the agglomerations formed in step (c), within the at least one shear-tank reactor to enhance leach kinetics of the metal sulfide particles, increase metal recovery from the metal sulfide particles, or reduce the effective electrochemical diffusion path lengths within the agglomerations formed in step (c).

* * * * *